United States Patent
Masumoto et al.

(10) Patent No.: US 8,456,389 B2
(45) Date of Patent: Jun. 4, 2013

(54) DISPLAY DEVICE AND CONTROL METHOD THEREOF

(75) Inventors: Kenichi Masumoto, Osaka (JP); Tetsurou Nakamura, Hyogo (JP)

(73) Assignee: Panasonic Corporation, Osaka (JP)

(*) Notice: Subject to any disclaimer, the term of this patent is extended or adjusted under 35 U.S.C. 154(b) by 657 days.

(21) Appl. No.: 12/762,699

(22) Filed: Apr. 19, 2010

(65) Prior Publication Data

US 2010/0201722 A1 Aug. 12, 2010

Related U.S. Application Data

(63) Continuation of application No. PCT/JP2009/002987, filed on Jun. 29, 2009.

(30) Foreign Application Priority Data

Jun. 30, 2008 (JP) ................................. 2008-170663

(51) Int. Cl.
*G09G 3/30* (2006.01)

(52) U.S. Cl.
USPC ................................. 345/77; 345/82; 345/215

(58) Field of Classification Search
USPC ................ 345/76, 77, 78, 82, 204, 205, 206, 345/208, 210, 214, 215, 690, 691; 250/552, 250/553; 313/463, 498, 506, 509, 512; 315/169.3
See application file for complete search history.

(56) References Cited

U.S. PATENT DOCUMENTS

| | | | |
|---|---|---|---|
| 5,923,910 A * | 7/1999 | Nakahara et al. | 396/124 |
| 6,809,481 B2 | 10/2004 | Seo et al. | |
| 7,167,169 B2 * | 1/2007 | Libsch et al. | 345/211 |
| 7,817,117 B2 * | 10/2010 | Kimura | 345/76 |
| 7,932,876 B2 | 4/2011 | Jo et al. | |
| 7,936,325 B2 * | 5/2011 | Miyata | 345/89 |
| 8,004,481 B2 * | 8/2011 | Yamazaki et al. | 345/82 |
| 2004/0012026 A1 | 1/2004 | Seo et al. | |
| 2004/0041751 A1 | 3/2004 | Takahashi | |
| 2004/0174349 A1 * | 9/2004 | Libsch et al. | 345/204 |

(Continued)

FOREIGN PATENT DOCUMENTS

| | | |
|---|---|---|
| CN | 1763820 | 4/2006 |
| JP | 11-008064 | 1/1999 |

(Continued)

OTHER PUBLICATIONS

China Office Action in Chinese Patent Application No. 200980100391.1, dated Sep. 11, 2012.

(Continued)

*Primary Examiner* — Tom Sheng
(74) *Attorney, Agent, or Firm* — Greenblum & Bernstein, P.L.C.

(57) ABSTRACT

A display device includes a luminescence element. A power line provides the luminescence element with an electric current. A capacitor accumulates a driving voltage corresponding to a data voltage. A driver flows the electric current according to the driving voltage accumulated in the capacitor through the luminescence element via the power line. A controller is configured to set a reverse bias voltage and an application time period according to an amount of luminescence produced by the luminescence element, and to determine luminance levels in luminescence periods. The controller sets the reverse bias voltage and the application time period according to a peak luminance of the luminance levels when a difference between the peak luminance and an average luminance of the luminance levels exceeds a predetermined threshold, and applies the reverse bias voltage for the application time period within an OFF period of the data voltage for removing an electric charge accumulated in the luminescence element. The OFF period is within one of the luminescence periods.

12 Claims, 17 Drawing Sheets

U.S. PATENT DOCUMENTS

| | | | |
|---|---|---|---|
| 2005/0104528 A1 | 5/2005 | Seo et al. | |
| 2006/0071885 A1* | 4/2006 | Fukuda | 345/76 |
| 2006/0092185 A1 | 5/2006 | Jo et al. | |
| 2006/0140477 A1* | 6/2006 | Kurumisawa et al. | 382/169 |
| 2006/0208657 A1 | 9/2006 | Hara et al. | |
| 2006/0267886 A1* | 11/2006 | Ozaki et al. | 345/76 |
| 2008/0284691 A1* | 11/2008 | Chung et al. | 345/76 |

FOREIGN PATENT DOCUMENTS

| | | |
|---|---|---|
| JP | 2003-323155 | 11/2003 |
| JP | 2003-323988 | 11/2003 |
| JP | 2004-279548 | 10/2004 |
| JP | 2005-003902 | 1/2005 |
| JP | 2005-301084 | 10/2005 |
| JP | 2006-119179 | 5/2006 |
| JP | 2006-259572 | 9/2006 |

OTHER PUBLICATIONS

U.S. Appl. No. 12/771,514 to Hiroshi Shirouzu et al., which was filed Apr. 30, 2010.

U.S. Appl. No. 12/797,150 to Hiroshi Shirouzu et al., which was filed Jun. 9, 2010.

* cited by examiner (Initial state)　　　(Deteriorated state)

(Initial state)　　　(Deteriorated state)

DISPLAY DEVICE AND CONTROL METHOD THEREOF

CROSS REFERENCE TO RELATED APPLICATION

This is a continuation application of PCT Application No. PCT/JP2009/002987 filed Jun. 29, 2009, designating the United States of America, the disclosure of which including specification, drawings and claims is incorporated herein by reference in its entirety.

The disclosure of Japanese Patent Application No. 2008-170663 filed on Jun. 30, 2008, including specification, drawings and claims is incorporated herein by reference in its entirety.

BACKGROUND OF THE INVENTION

1. Field of the Invention

The present invention relates to a display device using an organic EL element and a control method for recovering performance of the organic EL element.

2. Description of the Related Art

In recent years, since an organic EL (Electro Luminescence) element (hereinafter referred to as luminescence element or simply element) that is made of an organic material enables thin and lightweight display devices and high-speed responses by taking advantage of thin-film self luminescence in which recombination of electrons and holes is performed in an organic layer that is a component material, the organic EL element has attracted attention as a luminescence element used in thin display devices with high picture quality and high performance.

However, in the organic EL element at a time of driving, since many traps affecting electrons and holes of carriers reduce the carriers, luminescence efficiency tends to be reduced. Since the trapped carriers elevate a potential barrier for carrier transport, the luminescence efficiency is reduced.

Since the trapped carriers become space charges and prevent carriers for transport from moving, an electric current itself flowing in the element is consequently suppressed.

In addition, since the organic material itself constituting the element is highly resistive, application of a voltage causes an electric charge to be accumulated in the same manner as a capacitor.

Commonly used is a method for applying a reverse bias to the luminescence element in order to remove such an accumulated charge. A depth of a trap level at a time of applying the reverse bias varies depending on a usage condition, a method such as the following disclosed by Patent Reference 1 is employed to perform desirable reverse bias application according to the usage condition.

Patent Reference 1: Japanese Unexamined Patent Application Publication No. 2005-301084.

SUMMARY OF THE INVENTION

However, since the space charges depend on a fluctuation of an element driving voltage at a time of producing luminescence and an application time period of a driving voltage, the space charges are not always set to a high electric potential, and it is not necessary to always apply a reverse bias having a high electric potential. Furthermore, when an extremely high bias is applied to the element or a high forward electric potential is switched to a high reverse electric potential at once, a momentarily-strong inrush current is applied to the element, and there is a chance that a deterioration or destruction of the element is caused.

Moreover, when a value of a reverse bias is varied for each of luminescence cycles of the element, a significant burden is placed on a control system. In addition, from a point of view of power consumption, it is not preferable to apply a high reverse bias voltage at all times.

Based on the above viewpoints, an object of the present invention is to optimize efficiency of a performance recovery process for an organic EL element and reduce damage to the element caused by the reverse bias.

In order to solve the above problems, a display device using an organic EL element which is one aspect of the present invention includes: a luminescence element; a power line through which an electric current is supplied to the luminescence element, so as to cause the luminescence element to produce luminescence; a capacitor which accumulates a driving voltage corresponding to a data voltage to be supplied via a data line; a driving element which causes the electric current according to the driving voltage accumulated in the capacitor to flow through the luminescence element via the power line; and a control unit which sets a reverse bias voltage and an application time period of the reverse bias voltage according to an amount of luminescence produced by the luminescence element, and removes an electric charge accumulated in the luminescence element as the electric current is supplied to the luminescence element, by applying, to the luminescence element, the set reverse bias voltage for the set application time period in an OFF period of the data voltage, the amount of the produced luminescence corresponding to the data voltage in a predetermined luminescence period, and the OFF period being included in the predetermined luminescence period, wherein the control unit determines, for each of predetermined luminescence periods, luminescence luminance based on a data voltage in each of the predetermined luminescence periods, and sets the reverse bias voltage according to a magnitude of peak luminance and the application time period of the reverse bias voltage when a difference between the peak luminance of the luminescence luminance and average luminance of the luminescence luminance in each of the predetermined luminescence periods exceeds a predetermined threshold.

The display device using the organic EL element and the method for recovering the performance of the organic EL element according to the present application make it possible to extend an operating life of the luminescence element and suppress a deterioration in luminescence efficiency of the luminescence element without imposing a large electrical stress on the luminescence element, and at the same time to reduce the power consumption of the display device by suppressing an increase in a driving voltage or a driving current by optimizing electrical power used for a reverse bias and suppressing the deterioration in luminescence efficiency.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Figure 1:
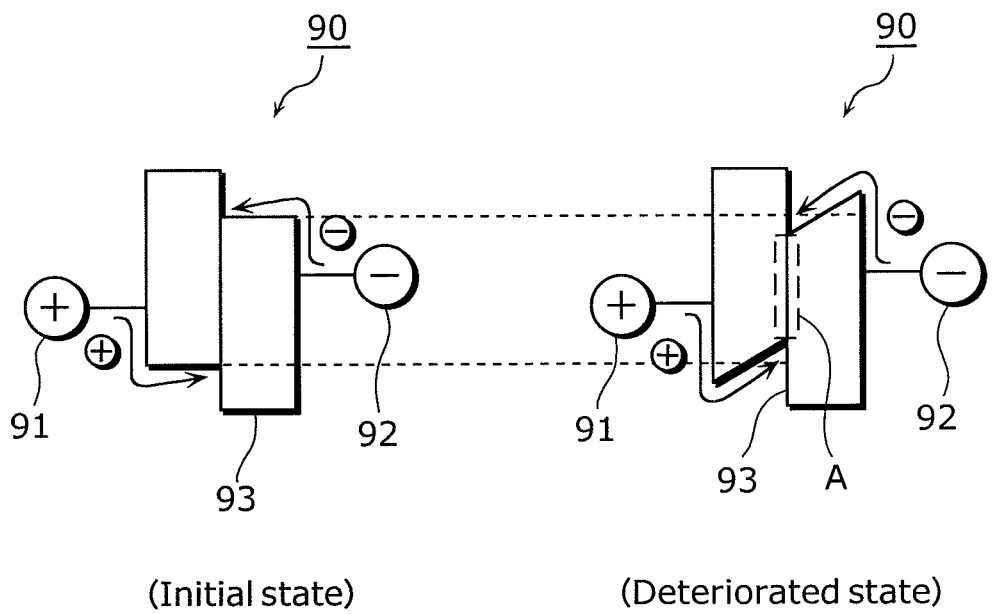
FIG. 1 is a diagram showing a deterioration in luminance of a luminescence element caused by formation of a trap level.

A display device using an organic EL element which is one aspect of the present invention includes: a luminescence element; a power line through which an electric current is supplied to the luminescence element, so as to cause the luminescence element to produce luminescence; a capacitor which accumulates a driving voltage corresponding to a data voltage to be supplied via a data line; a driving element which causes the electric current according to the driving voltage accumulated in the capacitor to flow through the luminescence element via the power line; and a control unit which sets a reverse bias voltage and an application time period of the reverse bias voltage according to an amount of luminescence produced by the luminescence element, and removes an electric charge accumulated in the luminescence element as the electric current is supplied to the luminescence element, by applying, to the luminescence element, the set reverse bias voltage for the set application time period in an OFF period of the data voltage, the amount of the produced luminescence corresponding to the data voltage in a predetermined luminescence period, and the OFF period being included in the predetermined luminescence period, wherein the control unit determines, for each of predetermined luminescence periods, luminescence luminance based on a data voltage in each of the predetermined luminescence periods, and sets the reverse bias voltage according to a magnitude of peak luminance and the application time period of the reverse bias voltage when a difference between the peak luminance of the luminescence luminance and average luminance of the luminescence luminance in each of the predetermined luminescence periods exceeds a predetermined threshold.

According to the present aspect, the reverse bias voltage and the application time period of the reverse bias voltage are set according to the amount of luminescence produced by the luminescence element, and the set reverse bias voltage for the set application time period in the OFF period of the data voltage is applied to the luminescence element, the amount of the produced luminescence corresponding to the data voltage in the predetermined luminescence period, and the OFF period being included in the predetermined luminescence period.

With this, the electric charge accumulated in the luminescence element as the electric current is supplied to the luminescence element is actively removed using the OFF period, included in the predetermined luminescence period, of the data voltage. Thus, the electric charge accumulated in the interface of the luminescence element can be effectively removed, and extension of the operating life of the luminescence element can be attempted by appropriately recovering the luminance of the luminescence element.

According to the present aspect, the luminescence luminance based on the data voltage in each of the predetermined luminescence periods is determined for each of predetermined luminescence periods, and the reverse bias voltage according to the magnitude of peak luminance and the application time period of the reverse bias voltage are set when the difference between the peak luminance of the luminescence luminance and average luminance of the luminescence luminance in each of the predetermined luminescence periods exceeds a predetermined threshold. With this, the reverse bias voltage and the application time of the reverse bias voltage can be set according to the data voltage. For example, the larger the amount of luminescence of the luminescence element according to the data voltage is, the larger an amount of sum of products between the reverse bias voltage and the application time of the reverse bias voltage is.

Here, it is considered that more electric charges caused by strong luminance are accumulated in the interface of the luminescence element when the difference between the peak luminance of the luminescence luminance and the average luminance of the luminescence luminance in each of the predetermined luminescence periods exceeds the predetermined threshold. In this case, the reverse bias voltage according to the magnitude of the peak luminance and the application time of the reverse bias voltage are set. Accordingly, the electric charges accumulated in the interface of the luminescence element can be removed more appropriately according to the data voltage.

Moreover, the control unit may set the reverse bias voltage according to a magnitude of the average luminance and the application time period of the reverse bias voltage when the difference between the peak luminance of the luminescence luminance and the average luminance of the luminescence luminance in each of the predetermined luminescence periods is equal to or less than the predetermined threshold and when the average luminance exceeds a second threshold.

According to the present aspect, the reverse bias voltage according to the magnitude of the average luminance and the application time period of the reverse bias voltage are set when the difference between the peak luminance of the luminescence luminance and the average luminance of the luminescence luminance in each of the predetermined luminescence periods is equal to or less than the predetermined threshold and when the average luminance exceeds the second threshold. With this, the reverse bias voltage and the application time of the reverse bias voltage can be set according to the data voltage. For instance, the large the amount of luminescence of the luminescence element is, the larger an amount of a sum of products between the reverse bias voltage and the application time of the reverse bias voltage is.

Here, it is considered that relatively less electric charges are accumulated in the interface of the luminescence element when the difference between the peak luminance of the luminescence luminance and the average luminance of the luminescence luminance in each of the predetermined luminescence periods is equal to or less than the predetermined threshold and when the average luminance exceeds the second threshold. In this case, the reverse bias voltage according to the magnitude of the average luminance and the application time of the reverse bias voltage are set. For this reason, the electric charges accumulated in the interface of the luminescence element can be removed more appropriately according to the data voltage without imposing an excessive electric stress on the luminescence element.

Furthermore, the control unit may not apply the reverse bias voltage to the luminescence element when the average luminance is equal to or less than the second threshold.

According to the present aspect, the reverse bias voltage is not applied to the luminescence element when the average luminance is equal to or less than the second threshold. It is considered that there are not many electric charges accumulated in the interface of the luminescence element when the average luminance is equal to or below the second threshold value. In this case, the reverse bias voltage is not applied to the luminescence element.

Accordingly, the deterioration of the luminescence element caused by applying an unnecessarily high reverse bias to the luminescence element can be prevented. To put it differently, an appropriate process can be performed according to the electric charges accumulated in the interface of the luminescence element without imposing the excessive electric stress on the luminescence element.

Moreover, the control unit may apply, to the luminescence element, an intermediate voltage that is lower than the driving voltage and higher than the reverse bias voltage at least either before or after the reverse bias is applied to the luminescence element, the driving voltage causing the luminescence element to produce luminescence.

According to the present aspect, overload to the luminescence element such as an inrush current to the luminescence element caused by a rapid potential change or overshoot is prevented by applying, when applying the reverse bias voltage to the luminescence element, the intermediate voltage to the luminescence element, instead of suddenly applying a voltage having a reverse polarity of a polarity of the driving voltage, the intermediate voltage being lower than the driving voltage that causes the luminescence element to produce luminescence and higher than the reverse bias voltage, and the damage to the luminescence element can be reduced.

Furthermore, the control unit may apply, to the luminescence element, the set reverse bias voltage for the set application time period in an OFF period of a data voltage, the OFF period being included in a last luminescence period among the predetermined luminescence periods.

According to the present aspect, power consumption associated with the application of the reverse bias voltage can be reduced by applying, to the luminescence element, the set reverse bias voltage for the set application time period in the OFF period of the data voltage, the OFF period being included in the last luminescence period among the predetermined luminescence periods.

Moreover, the control unit may set: the reverse bias to be a fixed value, and the application time period to be variable; the application time period to be a fixed value, and the reverse bias to be variable; or the reverse bias and the application time period to be variable.

According to the present aspect, as an example, an amount of application of reverse bias (sum of products between the reverse bias voltage and the application time) can be adjusted to an appropriate amount according to a situation of the luminescence element and the display device when attempting to recover performance of the luminescence element, for example, applying an appropriate amount of the reverse bias adjusted with the application time of the reverse bias when a voltage resistance of the luminescence element is low and there is no margin to adjust the magnitude of the reverse bias voltage or applying an appropriate amount of the reverse bias adjusted with the reverse bias voltage when a frame cycle is short and there is no margin to adjust the application time of the reverse bias voltage.

Furthermore, the control unit may: set the revere bias voltage according to the amount of the luminescence produced by the luminescence element and the application time period of the reverse bias voltage, the amount of the luminescence produced by the luminescence element being a sum total of luminescence time periods for each of which the luminescence element produces the luminescence in the predetermined luminescence period; set the reverse bias voltage according to the amount of the luminescence produced by the luminescence element and the application time period of the reverse bias voltage, the amount of the luminescence produced by the luminescence element being a sum total of luminescence luminance indicated by each of data signals corresponding to the data voltage in each of the predetermined luminescence periods; or determine the amount of the luminescence produced by the luminescence element based on a sum total of luminescence time periods for each of which the luminescence element produces the luminescence in the predetermined luminescence period and on a sum total of luminescence luminance indicated by each of data signals corresponding to the data voltage, and set the reverse bias voltage according to the amount of the luminescence produced by the luminescence element and the application time period of the reverse bias voltage.

According to the present aspect, the amount of the application of the reverse bias can be adjusted to the appropriate amount by specifying a degree of the deterioration of the luminescence element using one of or both the sum total of the luminescence time periods for each of which the luminescence element produces the luminescence in the predetermined luminescence period and the sum total of luminescence luminance indicated by each of the data signals corresponding to the data voltage in each of the predetermined luminescence periods.

In addition, the present invention can be realized not only as such a display device but also as the method for recovering the performance of the organic EL element.

Embodiment 1

The present invention has an object of improving luminescence luminance and luminescence efficiency with a small increase in electrical power when driving a display device using an organic EL element. The following describes in detail a display device of the present invention with reference to the drawings.

First, a trap level is described in detail.

Figure 2:
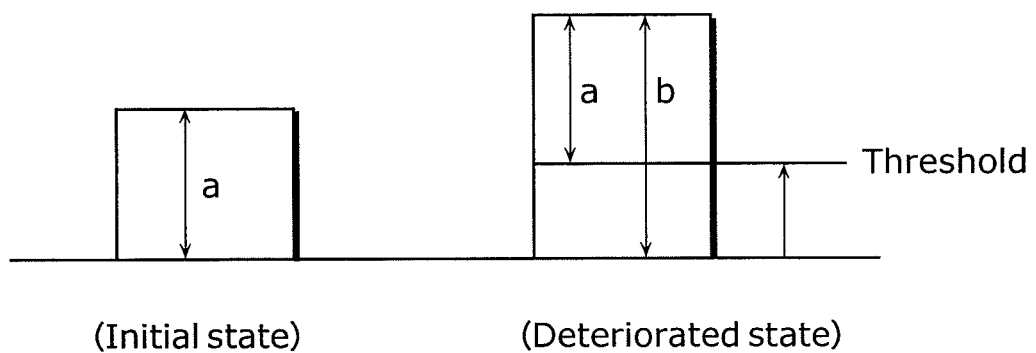
FIG. 2 is a diagram showing the deterioration in luminance of the luminescence element caused by the formation of the trap level.

FIGS. 1 and 2 each are a diagram showing a deterioration in luminance of a luminescence element 90 caused by formation of the trap level.

More specifically, FIG. 1 is a schematic view showing a structure of the luminescence element 90 to which a voltage is to be applied, and FIG. 2 is a graph showing a voltage value for causing the luminescence element 90 to produce luminescence. In addition, in each of FIGS. 1 and 2, the left side shows an initial state prior to the application of the voltage to the luminescence element 90, and the right side shows a deteriorated state in which the trap level is formed after the voltage is applied to the luminescence element 90.

As shown in FIGS. 1 and 2, the luminescence element 90 includes a hole injecting electrode 91, an electron injecting electrode 92, and an organic luminescence layer 93 arranged between the hole injecting electrode 91 and the electron injecting electrode 92.

First, the voltage is applied to the luminescence element 90 in the initial state shown in FIG. 1.

Then, electrons accumulate at the side of the electron injecting electrode 92, and holes accumulate at the side of the hole injecting electrode 91, the electron injecting electrode 92 and the hole injecting electrode 91 being near an interface of the organic luminescence layer 93 (A part shown in FIG. 1).

As shown by the deteriorated state in FIG. 1, this causes the trap level to form in the organic luminescence layer 93, which elevates a potential barrier. The potential barrier becomes a factor causing a deterioration in luminance of the luminescence element 90. In addition, as a larger amount of voltage is applied, a deeper trap level is formed and the deterioration in luminance of the luminescence element 90 becomes larger.

More specifically, as shown in FIG. 2, a voltage necessary for causing the luminescence element 90 to produce luminescence in the initial state is indicated by a. Then, after the voltage is applied to the luminescence element 90 and the luminescence element 90 produces the luminescence, the trap level is formed, and the potential barrier is elevated. Thus, as shown by the deteriorated state in FIG. 2, a threshold value of the voltage necessary for causing the luminescence element 90 to produce the luminescence increases, and it becomes necessary to apply a voltage b that is higher than the voltage a in order to obtain the same luminance.

To put it differently, along with the use of the luminescence element 90, the trap level is formed, a loss of voltage is caused by trapping an electrical charge, and lower luminance (element degradation) of the luminescence element 90 occurs.

Furthermore, the electrons accumulating at the side of the electron injecting electrode 92 and the holes accumulating at the side of the hole injecting electrode 91 are discharged by applying a reverse bias voltage to the luminescence element 90, and the potential barrier is lowered, the electron injecting electrode 92 and the hole injecting electrode 91 being near the interface of the organic luminescence layer 93. Stated differently, the deterioration of the luminescence element 90 can be recovered by removing the electrical charge accumulating in the trap level through the application of the reverse bias voltage.

Accordingly, the deterioration in luminance of the luminescence element 90 is recovered by restoring a state similar to the initial state as shown by FIG. 1. It is to be noted that as a degree of the deterioration of the luminescence element 90 progresses (usage time progresses), the trap level deepens, and it becomes necessary to apply a larger amount of the reverse bias voltage in order to remove the electrical charge trapped in the trap level.

Figure 3:
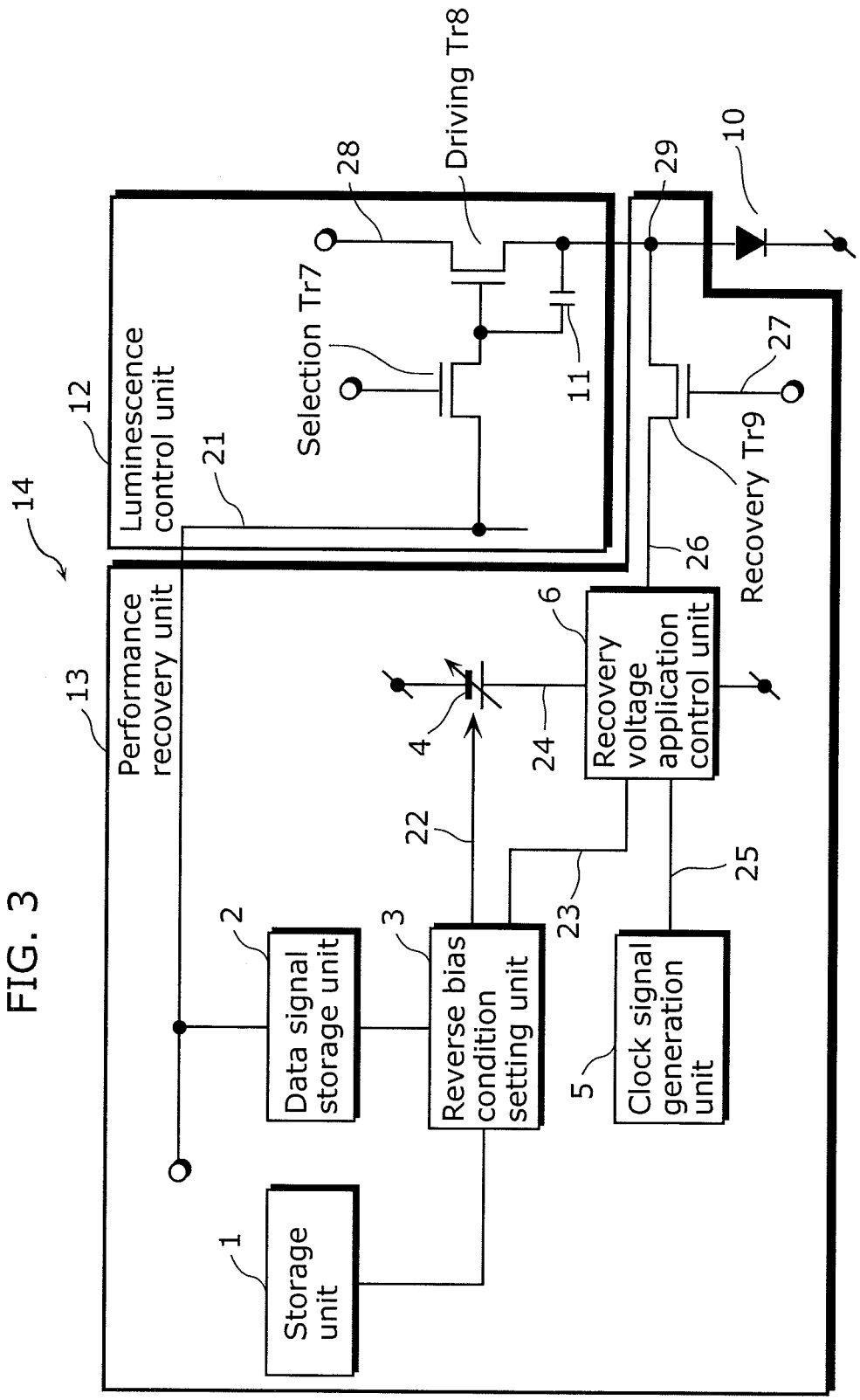
FIG. 3 is a functional block diagram showing an example of a structure of a display device according to Embodiment 1 of the present invention.

FIG. 3 is a functional block diagram showing an example of a structure of a display device 14 according to the present embodiment.

The display device 14 includes: an organic EL element 10; a luminescence control unit 12 which causes the organic EL element 10 to produce luminescence by applying to the organic EL element 10 a driving current having a magnitude according to a data signal 21 which specifies luminescence luminance; a performance recovery unit 13 which attempts to recover performance of the organic EL element 10 by applying a recovery bias voltage 26 to the organic EL element 10 in an extinction state.

The display device 14 may, for example, correspond to one pixel in an image display apparatus. The image display apparatus can be structured by two-dimensionally arranging display devices 14.

The present embodiment is described as a typical example where the data signal 21, which specifies a luminance value, is provided for each of frames of a moving picture, and a luminescence period and a recovery period of the organic EL element 10 are set in each frame.

The data signal 21 is input to a selection transistor 7 and a data signal recording unit 2 via a data signal line. A capacitor 11 holds the data signal 21 via the selection transistor 7 for each frame, and at the same time the data signal recording unit 2 records the data signal 21 for each of a predetermined number of frames.

During the luminescence period of the organic EL element 10, a luminescence driving voltage 28 is supplied to a driving transistor 8, and the driving transistor 8 applies, to the organic EL element 10, a driving current according to a voltage of the data signal held by the capacitor 11.

When the luminescence period of the organic EL element 10 ends, the supply of the luminescence driving voltage 28 is suspended. Then the recovery period of the organic EL element 10 starts when a recovery transistor 9 is turned ON.

A reverse bias condition setting unit 3 specifies an amount of the luminescence produced by the organic EL element 10 according to the data signal 21 recorded in the data signal recording unit 2, and sets a reverse bias voltage as a recovery bias voltage and an application time period of the reverse bias voltage according to the specified amount of the produced luminescence by referring to a table (to be described later) set in a storage unit 1. The reverse bias condition setting unit 3 then outputs a reverse bias voltage indicating signal 22 that indicates the set reverse bias voltage and a reverse bias period control voltage 23 that controls the set application time period.

A reverse bias power source 4 is a variable voltage source, and generates a reverse bias voltage 24 indicated by the reverse bias voltage indicating signal 22.

A clock signal generation unit 5 generates a clock signal 25 which sweeps a predetermined voltage range during each of frame periods.

A recovery voltage application control unit 6 controls an application time period of the reverse bias voltage 24 by comparing the clock signal 25 and the reverse bias period control voltage 23.

For instance, the recovery voltage application control unit 6 outputs the reverse bias voltage 24 generated by the reverse bias power source 4 during a period in which a level of the clock signal 25 is lower than the reverse bias period control voltage 23, and outputs an intermediate voltage that is lower than the luminescence driving voltage 28 and higher than the reverse bias voltage 24 during a period other than the above period.

Assuming that the intermediate voltage is a ground voltage for brevity in the description, the recovery voltage application control unit 6 fixes an output voltage to the ground voltage by pulling down the output voltage to the ground voltage during a period other than the period in which the reverse bias voltage 24 is outputted. Accordingly, since the recovery voltage application control unit 6 absorbs noise even when the noise is superimposed on the output voltage, an error in lighting and malfunction do not easily occur.

Through a series of the above operations, the two types of the recovery bias voltage, the reverse bias voltage and the intermediate voltage (ground voltage), are applied to the organic EL element 10 during each frame period.

Figure 4:
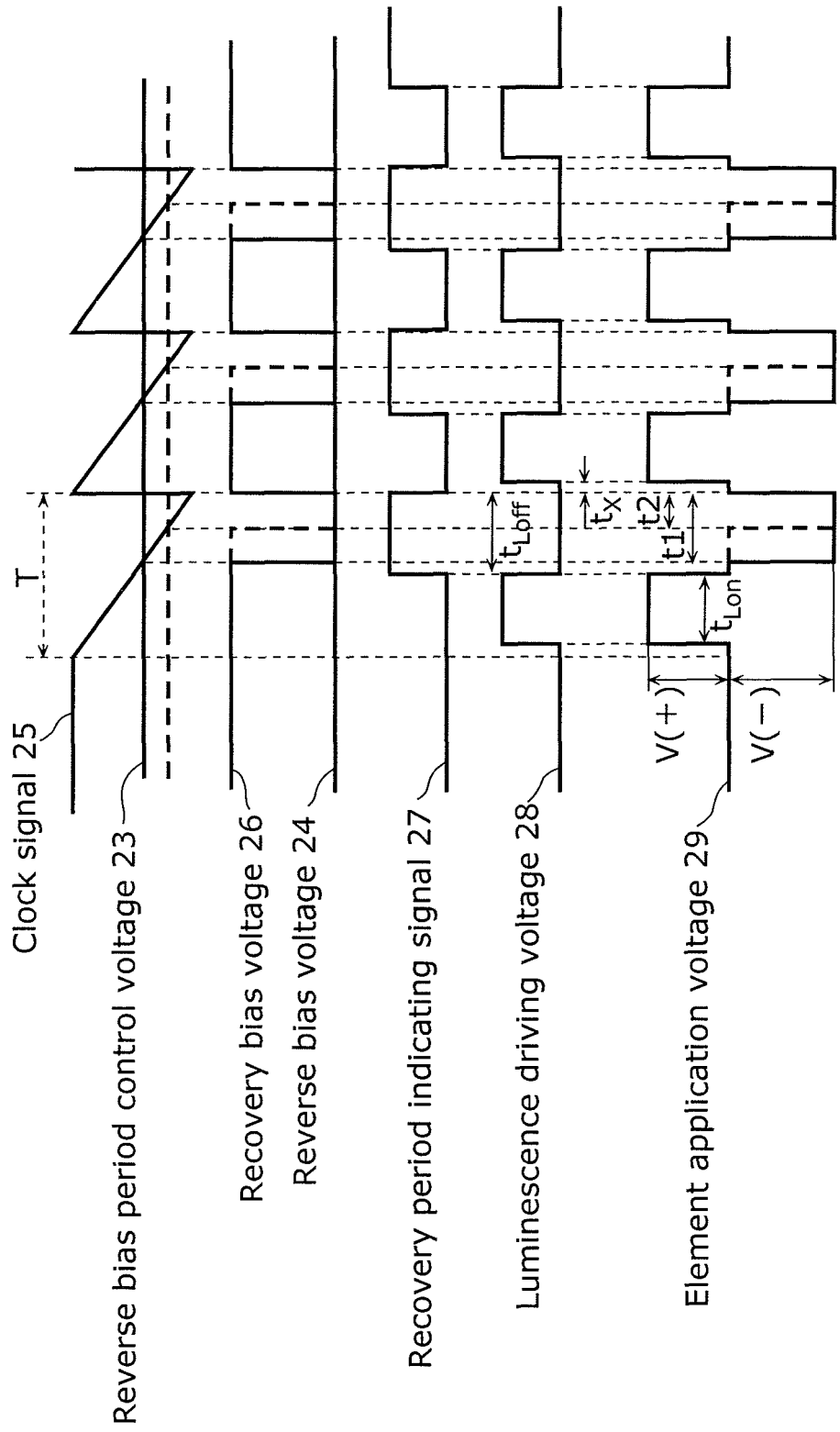
FIG. 4 is a timing diagram showing major signals in the display device.

FIG. 4 is a timing diagram showing major signals in the display device 14 according to the present embodiment.

During a luminescence period $t_{Lon}$, the luminescence driving voltage 28 is supplied to the organic EL element 10, and the organic EL element 10 produces luminescence at luminance according to the voltage of the data signal 21 held by the capacitor 11. After the luminescence period, the supply of the luminescence driving voltage 28 is suspended, and the organic EL element 10 becomes extinct.

During a recovery period $t_{Loff}$, the recovery transistor 9 is turned, ON with a recovery period indicating signal 27 in reverse phase with the luminescence driving voltage 28. Accordingly, the recovery bias voltage 26 outputted by the recovery voltage application control unit 6 is applied to the organic EL element 10.

The clock signal 25 has a cycle having a length T that is same as one frame of a moving picture, and a sawtooth waveform of which phase is advanced by tx in comparison with the luminescence driving voltage 28.

Even when a cross-over state in which the luminescence driving voltage 28 and the recovery period indicating signal 27 are concurrently turned ON occurs by any chance, by using such a clock signal 25, a luminescence output is only short-circuited to a ground level, and it is possible to prevent a situation in which one or both of a power source supplying the luminescence driving voltage and the reverse bias power source 4 are destroyed when the power sources are shorted out.

As indicated by an element application voltage 29, the reverse bias voltage is applied to the organic EL element 10 as the recovery bias voltage when the reverse bias period control voltage 23 exceeds the clock signal 25. In a case other than the above, the recovery voltage application control unit 6 forcibly grounds the output, and thus the ground voltage is applied to the organic EL element 10 as the reverse bias voltage.

The application time period of the reverse bias voltage in the recovery period can be changed from t1 to t2 by lowering the reverse bias period control voltage 23 indicated by a solid line to a level indicated by a broken line.

Figure 5:
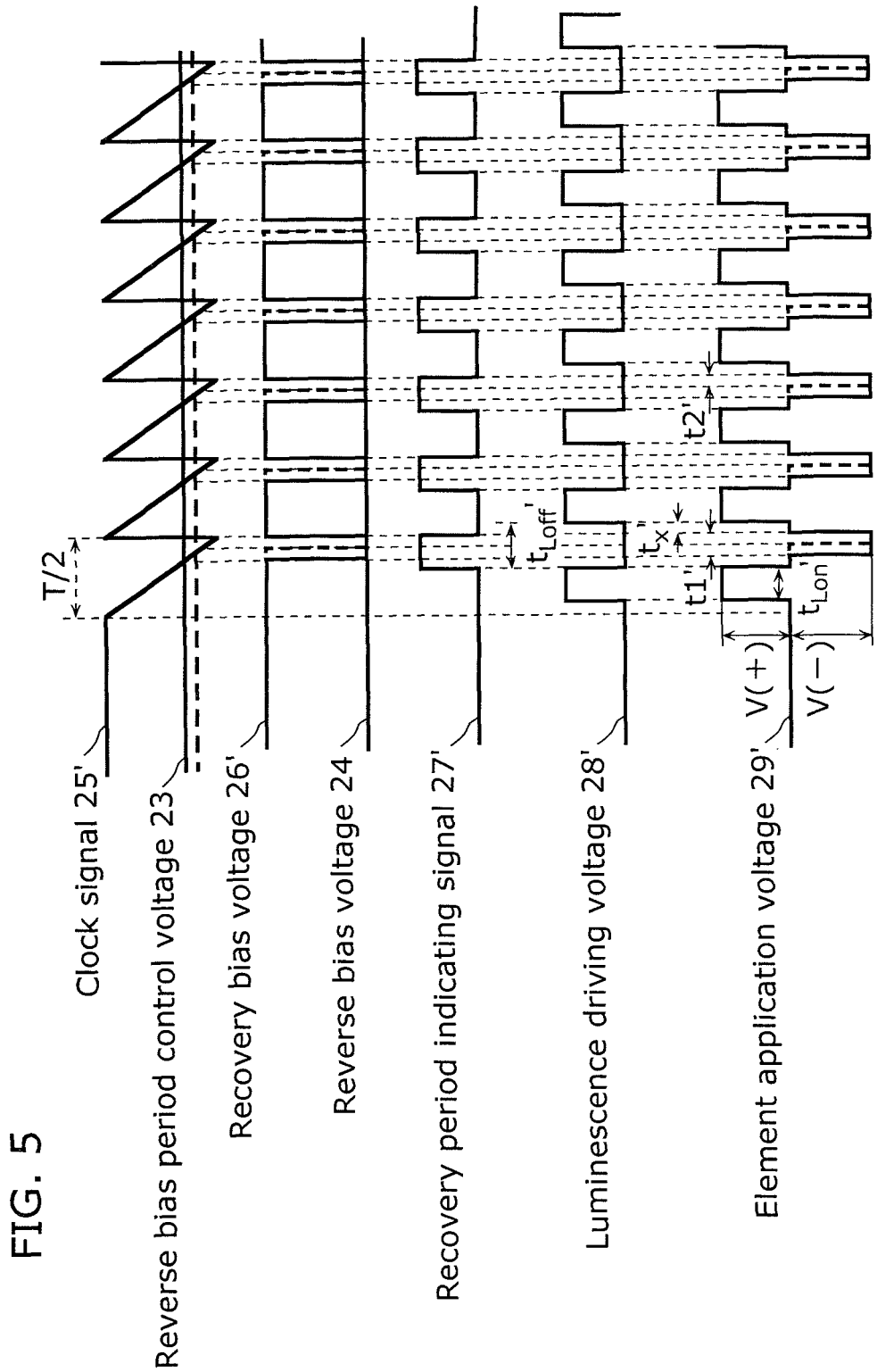
FIG. 5 is a timing diagram showing major signals at a time of double-speed driving.

Moreover, when double-speed driving in which a frame cycle is reduced to T/2 is performed, as shown in FIG. 5, a clock signal 25', a recovery period indicating signal 27', and a luminescence driving voltage 28' are used, the clock signal 25', the recovery period indicating signal 27', and the luminescence driving voltage 28' being respectively obtained by reducing to a ½ cycle the clock signal 25, the recovery period indicating signal 27, and the luminescence driving voltage 28 in corresponding to the reduced frame cycle T/2.

Accordingly, a recovery bias voltage 26' and an element application voltage 29' each having timing suitable for the double-speed driving are generated, and thus the double-speed driving is easily realized.

Figure 6:
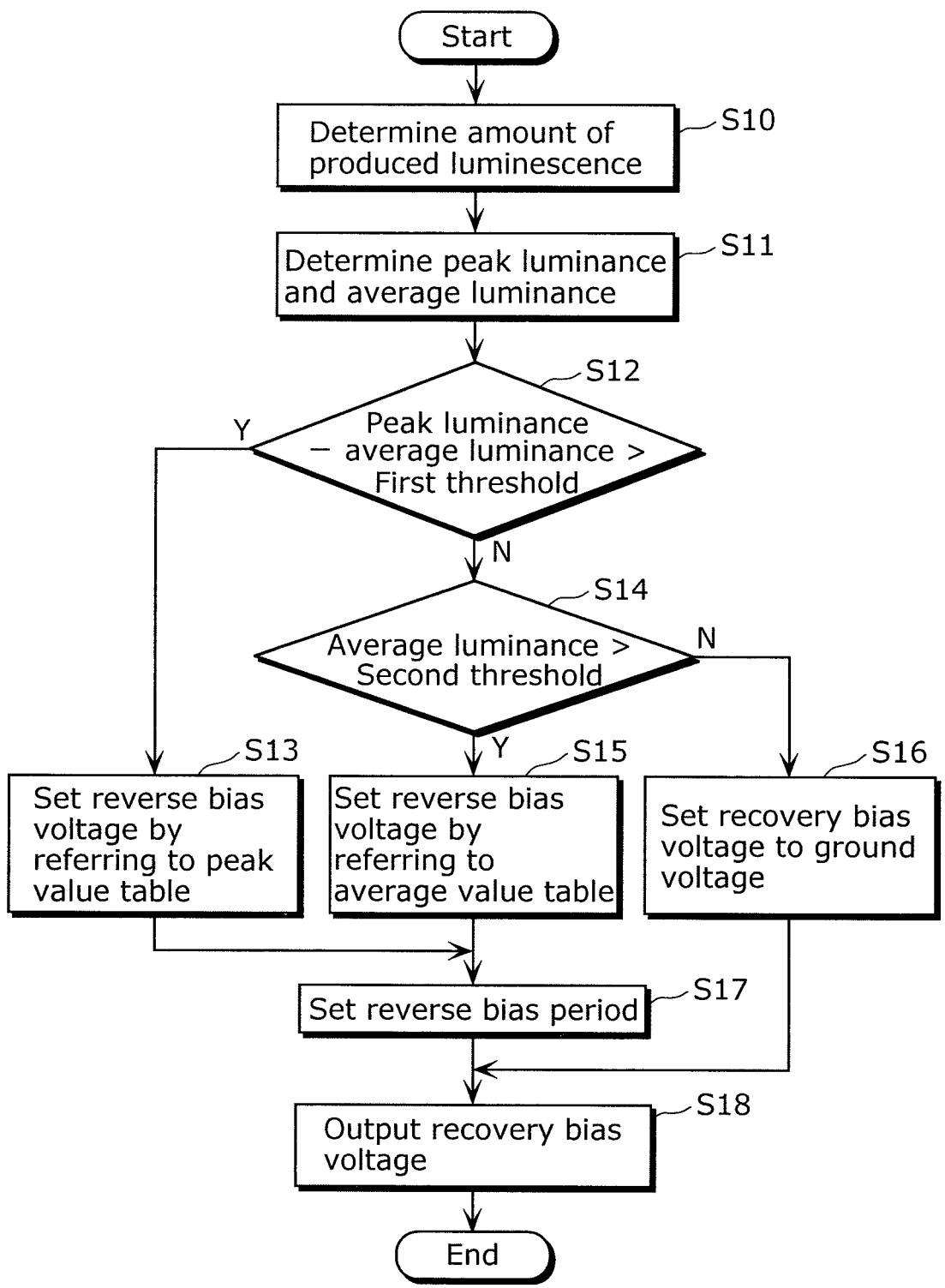
FIG. 6 is a flow chart showing an example of operations of the display device.

FIG. 6 is a flow chart showing an example of operations of the performance recovery unit 13.

The reverse bias condition setting unit 3 specifies an amount of luminescence produced by the organic EL element 10 during a predetermined number of frame periods based on luminescence luminance specified by the data signal recorded in the data signal recording unit 2 (S10).

When an N number of data signals each of which specifies luminescence luminance in an N number of frames is recorded in the data signal recording unit 2, an amount of produced luminescence is, for example, determined as follows.

Where luminescence luminance specified in an i-th frame is $V_i(+)$ and a luminescence time period is $t(V_i(+))$, the amount of the produced luminescence is a sum of products α between $V_i(+)$ and $t(V_i(+))$ over the N number of frames according to (Equation 1).

[Math. 1]

$$\sum_{i=1}^{N}(V_i(+) \times t(V_i(+))) = \alpha \quad \text{(Equation 1)}$$

Here, the luminescence luminance $V_i(+)$ corresponds to a forward bias luminescence driving voltage or a forward bias luminescence driving current that is to be applied to the organic EL element 10 when producing the luminescence according to the data signal. The luminescence time period $t(V_i(+))$ is a duration of the aforementioned luminescence period $t_{Lon}$.

It is to be noted that instead of using the sum of products between the luminescence luminance and the luminescence time period as the amount of the produced luminescence, for instance, a total sum of luminescence luminance or a total sum of luminescence time periods may be used as an amount of produced luminescence.

Next, the reverse bias condition setting unit 3 determines peak luminance $V_{peak}$ that is the maximum value of the luminescence luminance $V_i(+)$ and average luminance $V_{ave}$ that is an average value of the same (S11).

Figure 7A:
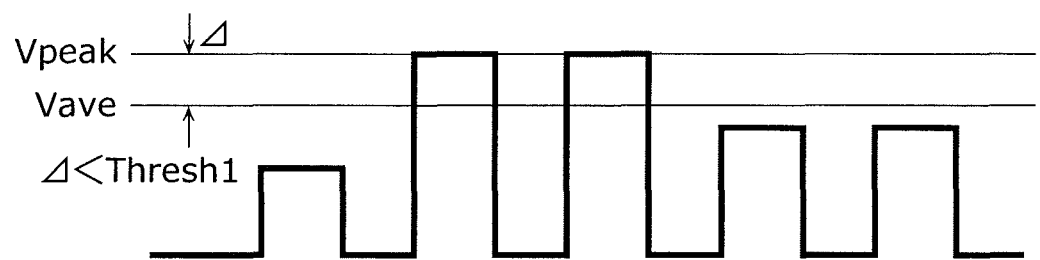
FIGS. 7A to C are diagrams showing an example of a sequence of data signals.

As shown in FIG. 7A, when a difference Δ between the peak luminance $V_{peak}$ and the average luminance $V_{ave}$ is larger than the first threshold Thresh1 (Yes in S12), a reverse bias voltage corresponding to the peak luminance $V_{peak}$ is referred to from a peak value table set in the storage unit 1 (S13).

Figure 8A:
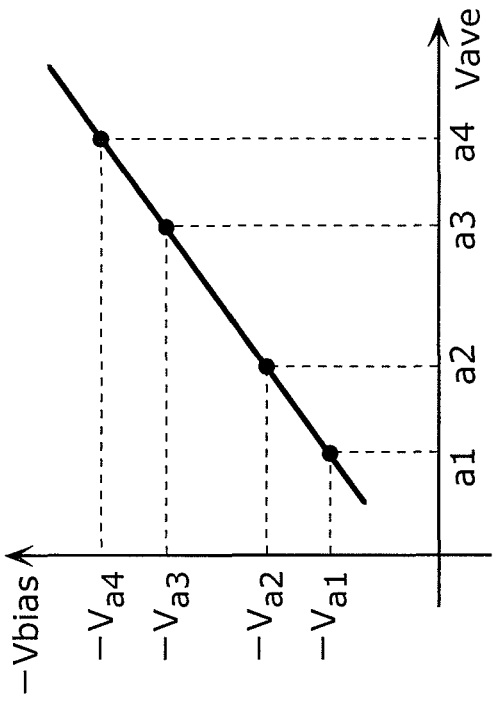
FIG. 8A is a diagram showing contents of a peak value table.

FIG. 8A is a diagram schematically showing contents of the peak value table. The peak value table holds sets of values each indicating peak luminance $V_{peak}$ and a corresponding reverse bias voltage $-V_{bias}$, as indicated by, for instance, points shown in FIG. 8A.

Since, when excessively high luminance instantaneously appears, temperature of the organic EL element when producing luminescence is instantaneously raised and the raised temperature causes damage that may reduce the life of the organic EL element, it is desirable to perform a recovery process comparable to a magnitude of peak luminance. Here, when there is prominent peak luminance that is greater than the first threshold in comparison with average luminance, the reverse bias voltage is set according to the magnitude of not the average luminance but the peak luminance.

Figure 7B:
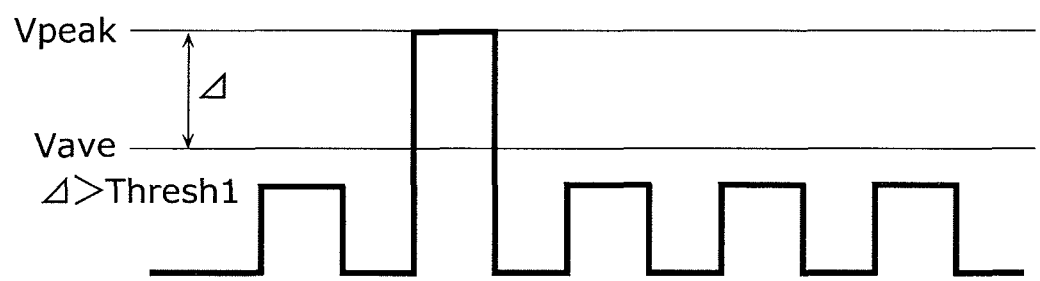

Furthermore, as shown in FIG. 7B, when the difference Δ between the peak luminance $V_{peak}$ and the average luminance $V_{ave}$ is equal to or less than the first threshold Thresh1 (No in S12) and the average luminance $V_{ave}$ is greater than the second threshold Thresh2 (Yes in S14), a reverse bias voltage corresponding to the average luminance $V_{ave}$ is referred to from an average value table set in the storage unit 1 (S15).

Figure 8B:
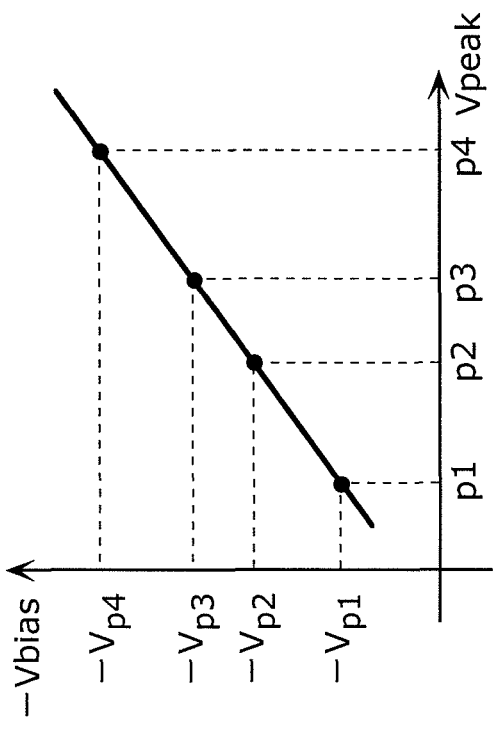
FIG. 8B is a diagram showing contents of an average value table.

FIG. 8B is a diagram schematically showing contents of the average value table. The average value table holds sets of values each indicating average luminance $V_{ave}$ and a corresponding reverse bias voltage $-V_{bias}$, as indicated by, for instance, points shown in FIG. 8B.

Since, when high luminance instantaneously does not appear, a magnitude of average luminance strongly reflects a degree of deterioration of the organic EL element, it is desirable to perform a recovery process comparable to the magnitude of the average luminance. Here, when there is no prominent peak luminance, a reverse bias voltage is set according to the average luminance.

Figure 7C:
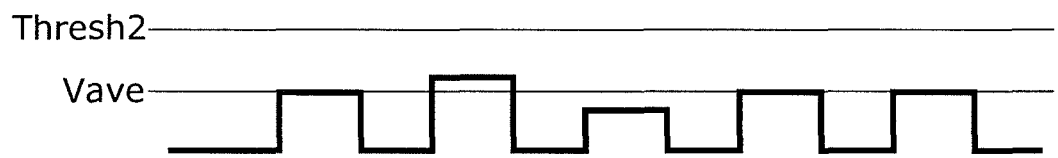

Moreover, as shown in FIG. 7C, when there is no prominent peak luminance and average luminance $V_{ave}$ is equal to or less than the second threshold Thresh2 (No in S14), a recovery bias voltage is set to a ground voltage (S16).

Since, when there is no prominent peak luminance and the average luminance is equal to or less than the second threshold, a residual electric charge is very shallow and a potential barrier is low, it is possible to achieve a balance between an effect of recovering the performance of the organic EL element and an effect of saving power not by actively applying the reverse bias voltage but by applying the ground voltage as the recovery bias voltage.

When the reverse bias voltage is set in S13 and S15, a revere bias period in which the reverse bias voltage is applied is set (S17). For instance, duration of the reverse bias period is determined as follows.

Where a reverse bias voltage to be applied in a j-th frame is $V_j(-)$ and an application time period is $t(V_j(-))$, the application time period is determined such that a sum of products between $V_j(-)$ and $t(V_j(-))$ over the N number of frames according to (Equation 2) corresponds to the amount of the produced luminescence determined by (Equation 1).

[Math. 2]

$$\sum_{j=1}^{N}(Vj(-) \times t(Vj(-))) = \alpha K \quad \text{(Equation 2)}$$

Here, the reverse bias voltage $V_j(-)$ is the reverse bias voltage set in S13 and S15. K is a predetermined adjustment factor.

When the same reverse bias voltage $V(-)$ and the same application time period t are set for each j, an application time period is determined according to (Equation 3).

[Math. 3]

$$t = \frac{\alpha K}{N \times V(-)} \quad \text{(Equation 3)}$$

In this case, since the number of frames N is a fixed number of times, the application time period t is expressed, with respect to the reverse bias voltage $V(-)$, as an inverse proportion function as indicated by (Equation 4).

[Math. 4]

$$t = \frac{\beta}{V(-)} \quad \text{(Equation 4)}$$

Although, for example, the inverse proportion function enables a time period to be set with a table reference method, for easier setting, the present invention employs circuit setting with a method for comparing with a sawtooth clock signal.

Figure 9A:
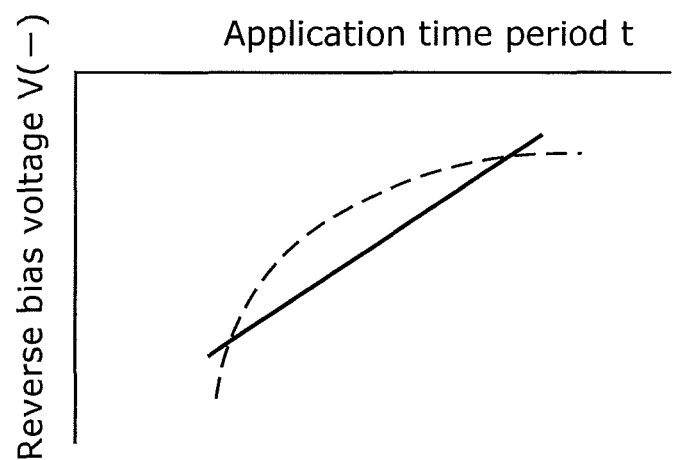
FIGS. 9A and B are diagrams showing an operation for setting an application time period of a reverse bias.
Figure 9B:
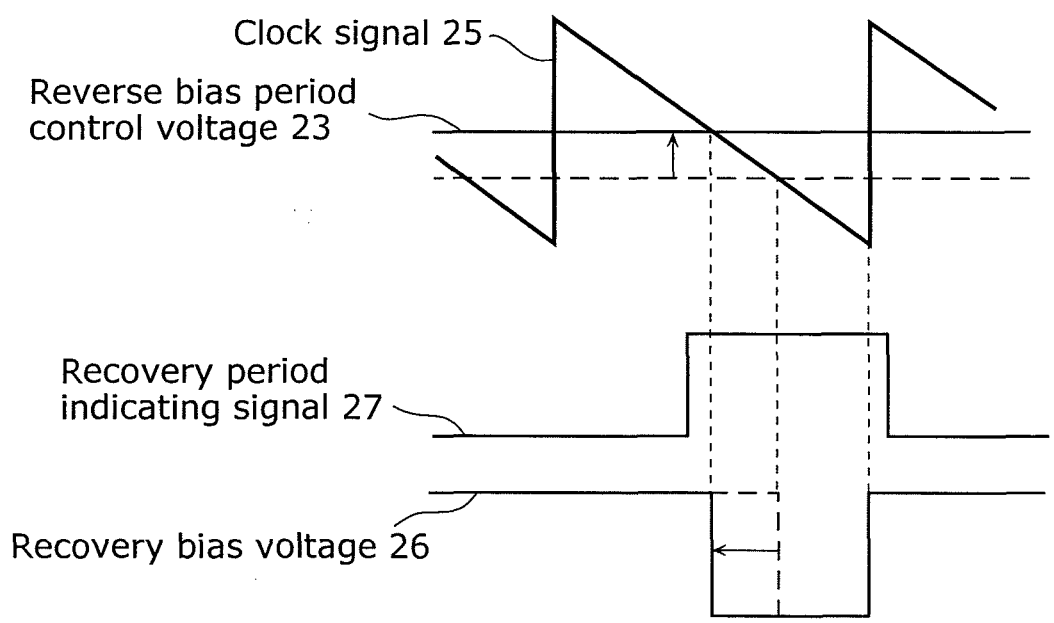

As shown in FIG. 9A, a linear function (solid line) approximating the inverse proportion function (broken line) of (Equation 4) is set. Then, as shown in FIG. 9B, a slope of the clock signal 25 is set identical to a slope of the set approximate linear function, the clock signal 25 and the reverse bias period control voltage 23 proportional to the reverse bias $V(-)$ to be applied are compared with a comparator, and the application time period t of the reverse bias is set based on a result of the comparison.

In this case, although application timing and an application time period of a reverse bias is outputted as the application time period t only during a period in which (Equation 4) is approximated, as for final output timing, the application timing and the application time period are not outputted with unnecessary timing but are outputted by determining a logical product with a recovery period indicating signal.

The application time period t is extended and thus the reverse bias is applied longer as the reverse bias period control voltage 23 is higher, that is, the reverse bias voltage $V(-)$ is smaller. In other words, with respect to a deep electric charge trap that cannot be removed when a reverse bias is not high, the damage to the element is reduced by applying a higher reverse bias voltage for a shorter time period.

In contrast, with respect to an electric charge trap that can be removed without really applying a reverse bias, a deeper trap is to be removed by applying a low reverse bias voltage for a long time period.

It becomes possible to quickly set the application time period of the reverse bias by determining the application time period through operations of hardware (comparator) as stated above, without imposing a load on a control unit or the like.

The reverse bias condition setting unit 3 outputs, to the recovery voltage application control unit 6, the reverse bias period control voltage 23 according to the application time period t determined in the above manner.

The recovery voltage application control unit 6 outputs, as the recovery bias voltage 26, either the reverse bias voltage 24 or the ground voltage, one of which is in accordance with the reverse bias period control voltage 23 (S18). The recovery transistor 9 applies the recovery bias voltage 26 to the organic EL element 10 during the recovery period in which the recovery period indicating signal 27 is provided.

It is to be noted that although it has been described above that the reverse bias voltage is set by referring to either the peak value table based on the peak luminance or the average value table based on the average luminance, the slope in the graph shown in FIG. 8A or B may be first stored as a constant of proportion p, and a reverse bias voltage may be then calculated in each case by multiplying the peak luminance or the average luminance by the constant of proportion β. In addition, the reverse bias voltage may be set using the peak value table, the average value table, and the constant of proportion, the peak value table and the average value table varying depending on a color of luminescence produced by the organic EL element 10.

The application time period t is set to be shorter than the recovery period $t_{Loff}$, that is, $t_{Loff} > t$. Accordingly, it becomes possible to supply, as the recovery bias voltage, the ground voltage that is the intermediate voltage between the luminescence driving voltage and the reverse bias voltage at least in a portion of the recovery period.

Figure 10A:
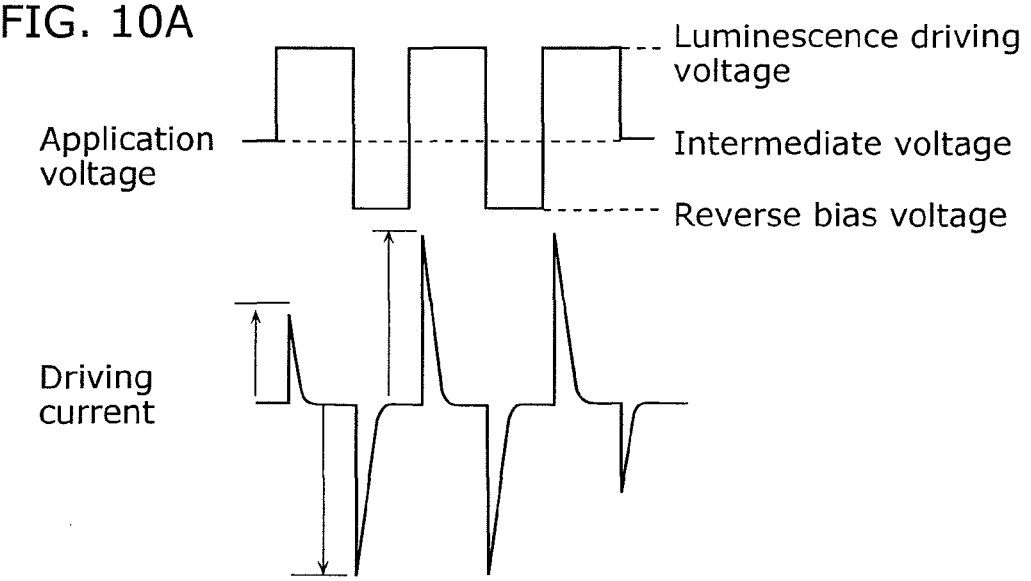
FIGS. 10A to C are diagrams showing a relationship between an applied voltage and a driving current to the organic EL element.

FIG. 10A is a graph showing a time change in a driving current flowing in the organic EL element 10 when a voltage applied to the organic EL element 10 is changed not via the intermediate voltage between the luminescence driving voltage and the reverse bias voltage. As shown in FIG. 10A, an inrush current occurs in the driving current at a point where the luminescence driving voltage is changed to or from the reverse bias voltage.

Figure 10B:
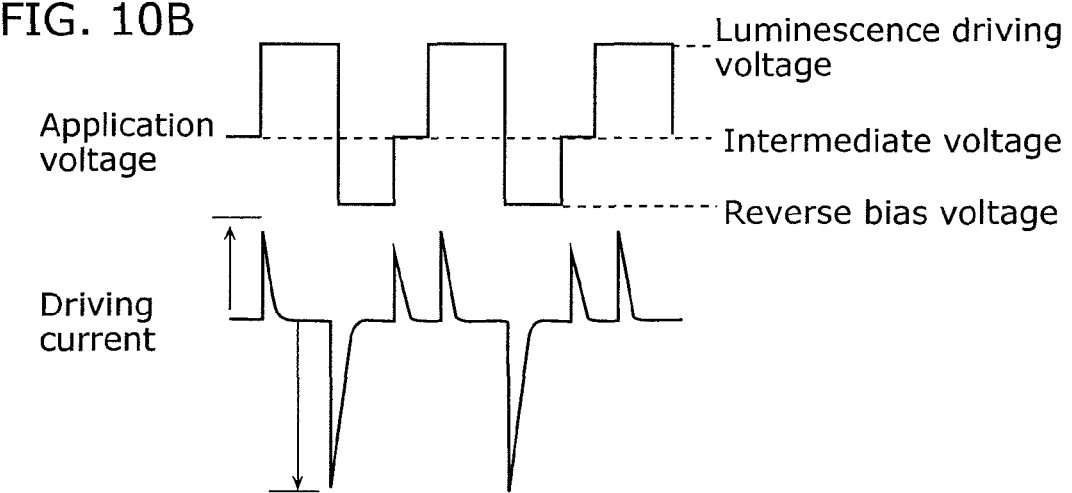

FIG. 10B is a graph showing a time change in a driving current when the applied voltage is changed not via the intermediate voltage from the luminescence driving voltage to the reverse bias voltage and is changed via the intermediate voltage from the reverse bias voltage to the luminescence driving voltage. As shown in FIG. 10B, the inrush current occurring in the driving current decreases at a point where the reverse bias voltage is changed to the luminescence driving voltage.

Figure 10C:
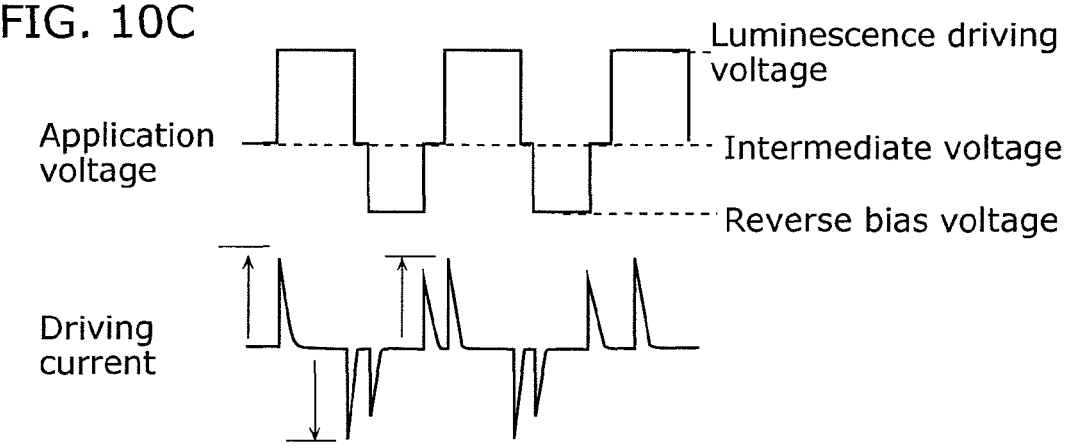

FIG. 10C is a graph showing a time change in a driving current when the applied voltage is changed via the intermediate voltage halfway either from the luminescence driving voltage to the reverse bias voltage or from the reverse bias voltage to the luminescence driving voltage. As shown in FIG. 10C, the inrush current occurring in the driving current decreases at a point where the luminescence driving voltage is changed to the reverse bias voltage and a point where the reverse bias voltage is changed to the luminescence driving voltage.

As stated above, the inrush current caused by a drastic change in voltage between the luminescence driving voltage and the reverse bias voltage is prevented by supplying, as the recovery bias voltage, the ground voltage that is the intermediate voltage. Here, output start timing for the reverse bias is determined by comparing the reverse bias period control voltage 23 and the sawtooth clock signal 25.

It is to be noted that when a reverse bias voltage and an application time period are set according to (Equation 2) using an amount of produced luminescence determined by (Equation 1), one of the reverse bias voltage and the application time period may be set to a fixed value regardless of the amount of the produced luminescence, and the other one of the reverse bias voltage and the application time period may be set to be variable according to the amount of the produced luminescence.

Figure 11:
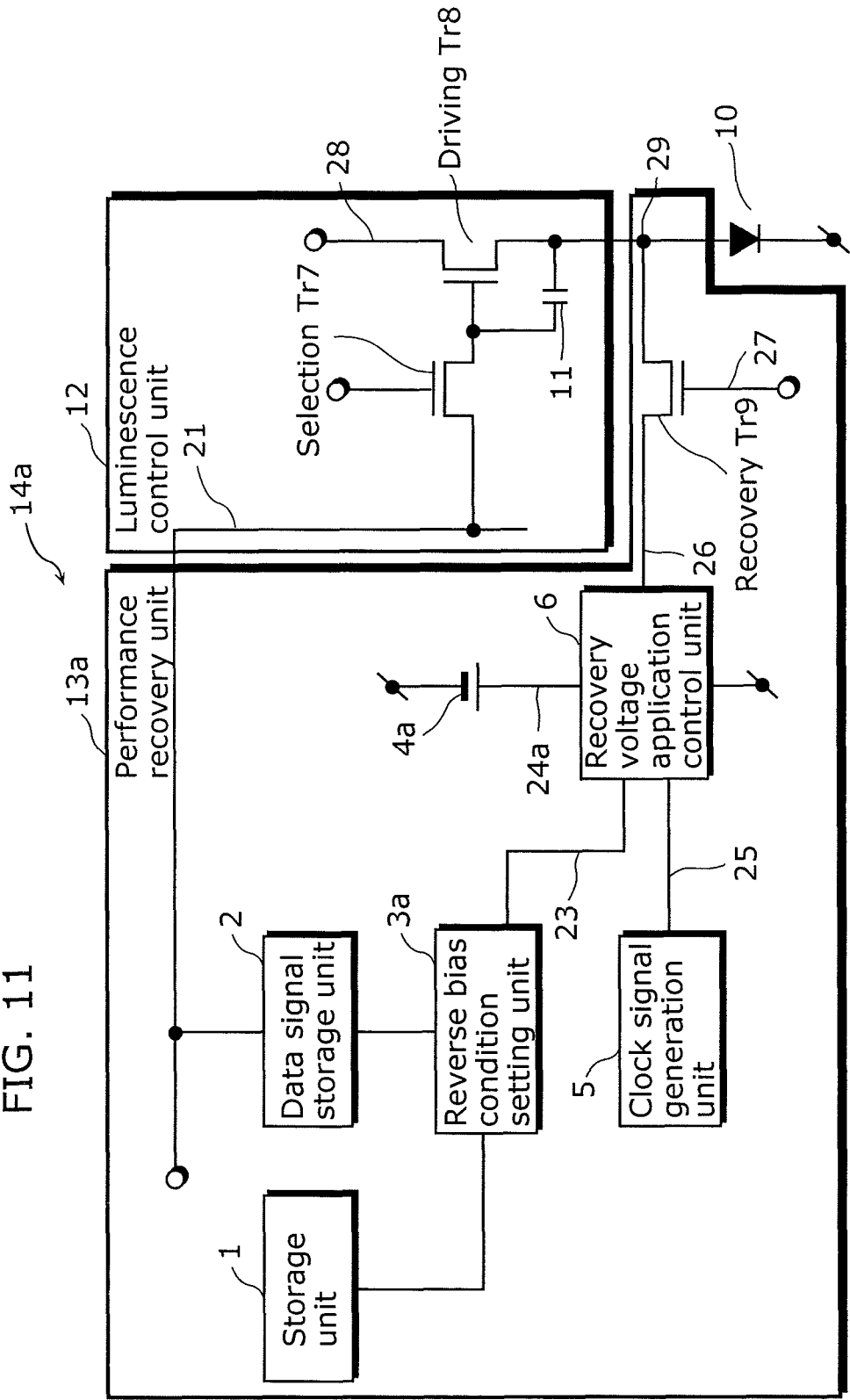
FIG. 11 is a functional block diagram showing another example of the structure of the display device.

FIG. 11 is a functional block diagram showing an example of a structure of a display device 14a which sets a reverse bias voltage to a fixed value regardless of an amount of produced luminescence and sets an application time period to be variable according to the amount of the produced luminescence. In a performance recovery unit 13a, a reverse bias power source 4a generates a fixed reverse bias voltage 24a, and a reverse bias condition setting unit 3a sets only an application time period of the reverse bias voltage to be variable.

With this structure, for instance, when a voltage resistance of the organic EL element 10 is low and an adjustment of a magnitude of the reverse bias voltage is not allowed for, it is possible to set only the application time period to be variable according to the amount of the produced luminescence.

In this case, as in the manner stated above, it is possible to produce an effect of preventing the inrush current caused by the dramatic change in voltage between the luminescence driving voltage and the reverse bias voltage by setting the application time period shorter than the recovery time period.

Figure 12:
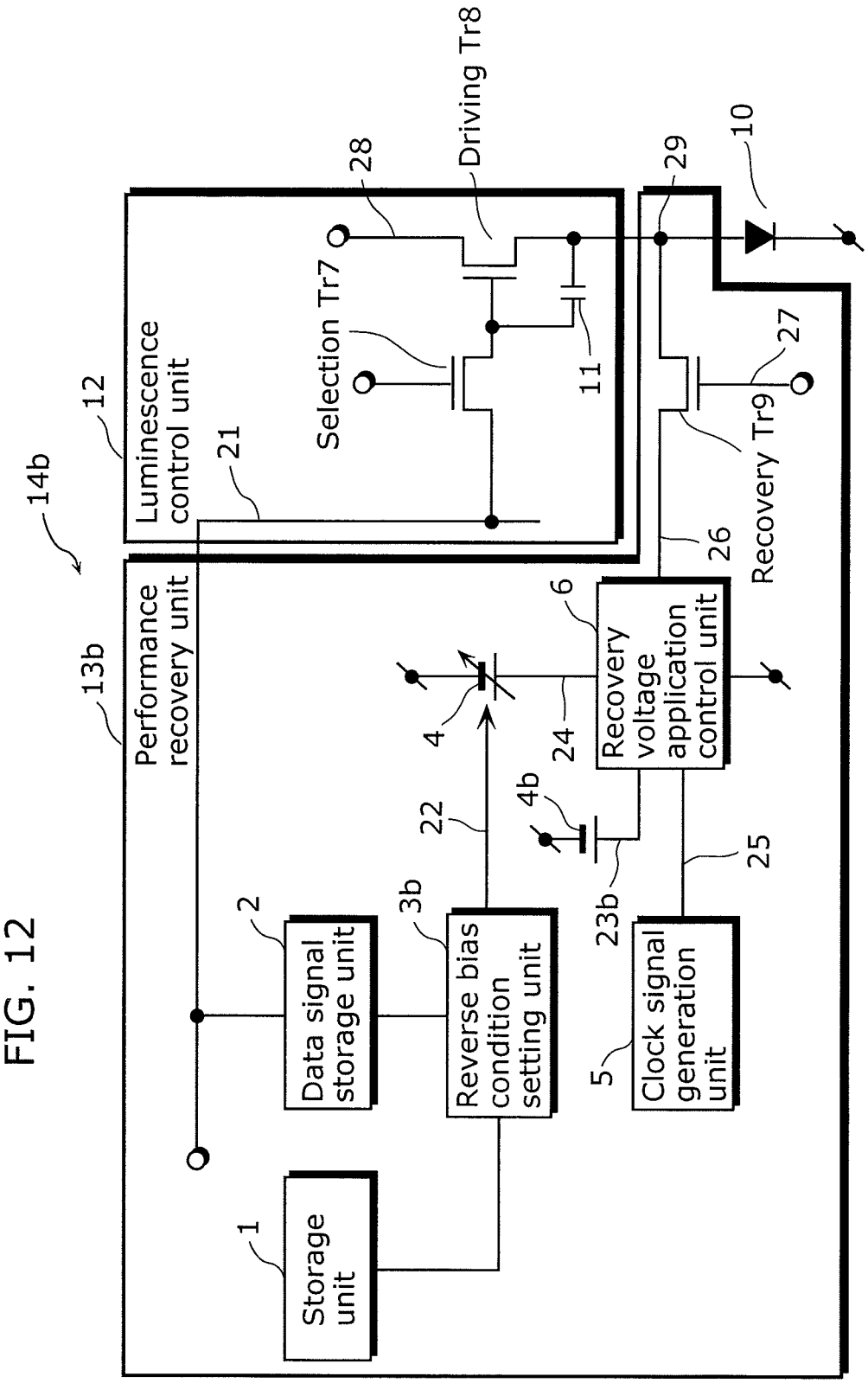
FIG. 12 is a functional block diagram showing still another example of the structure of the display device.

FIG. 12 is a functional block diagram showing an example of a structure of a display device 14b which sets an application time period to a fixed value regardless of an amount of produced luminescence and sets a reverse bias voltage to be variable according to the amount of the produced luminescence. In a performance recovery unit 13b, a constant-voltage source 4b generates a fixed reverse bias period control voltage 23b, and a reverse bias condition setting unit 3b sets only the reverse bias voltage to be variable.

With this structure, for example, when a frame period T is short and adjustment of the application time period of the reverse bias voltage is not allowed for, it is possible to set only the reverse bias voltage to be variable according to the amount of the produced luminescence. It is to be noted that, in this case, an absolute value of the reverse bias voltage is set to be below an absolute value of a luminescence driving voltage.

Embodiment 2

Next, the following describes a display device according to Embodiment 2 of the present invention. The display device is an active matrix display device which applies a recovery bias voltage to an organic EL element included in each of pixel circuits constituting the display device.

Figure 13:
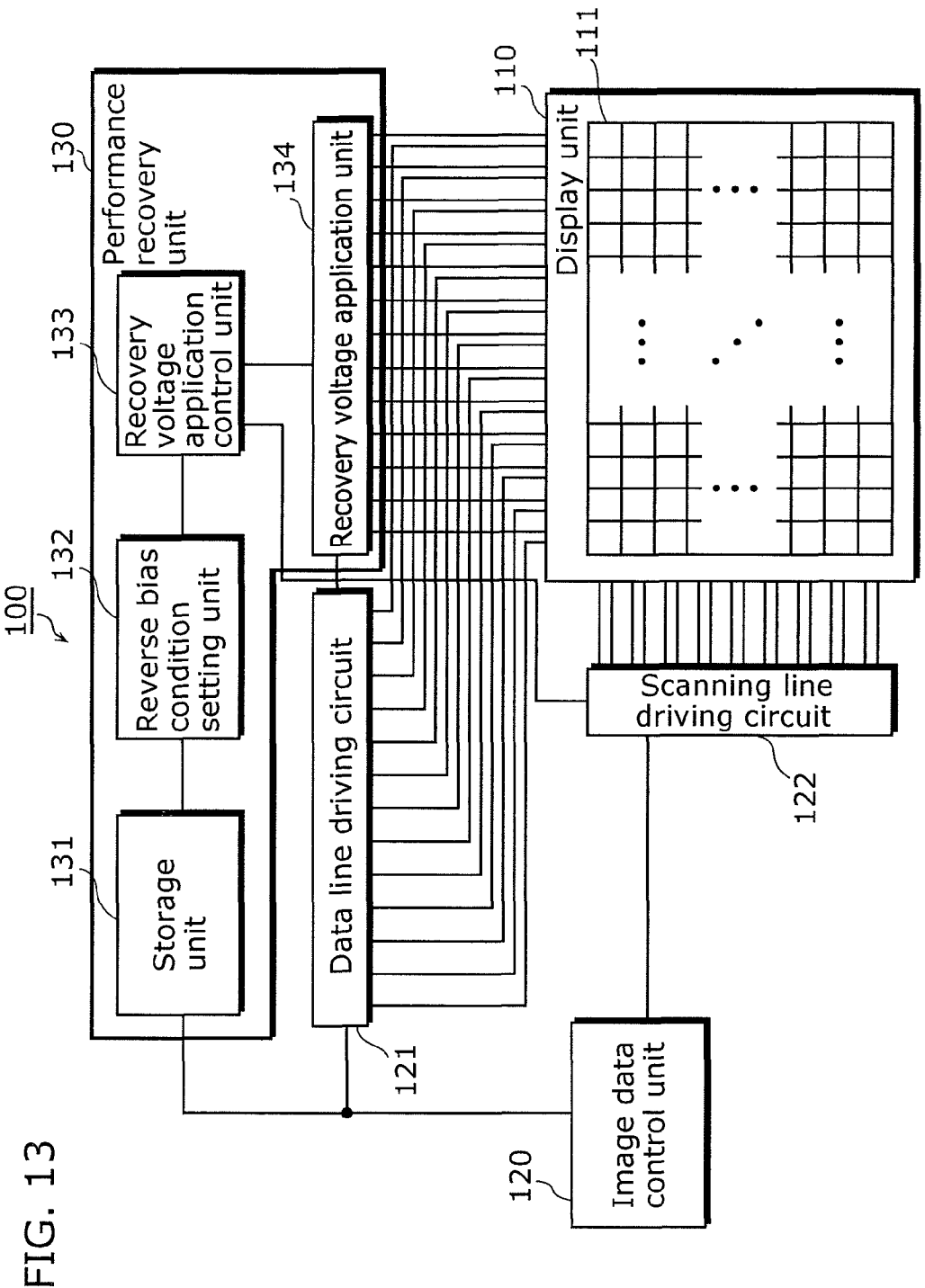
FIG. 13 is a functional block diagram showing an example of a structure of a display device according to Embodiment 2 of the present invention.

FIG. 13 is a block diagram roughly showing an example of a functional structure of a display device 100 according to Embodiment 2.

The display device 100 includes a display unit 110, an image data control unit 120, a data line driving circuit 121, a scanning line driving circuit 122, and a performance recovery unit 130. The display unit 110 is structured by arranging pixel circuits 111 in columns and rows. The performance recovery unit 130 includes a storage unit 131, a reverse bias condition setting unit 132, a recovery voltage application control unit 133, and a recovery voltage application unit 134.

Figure 14:
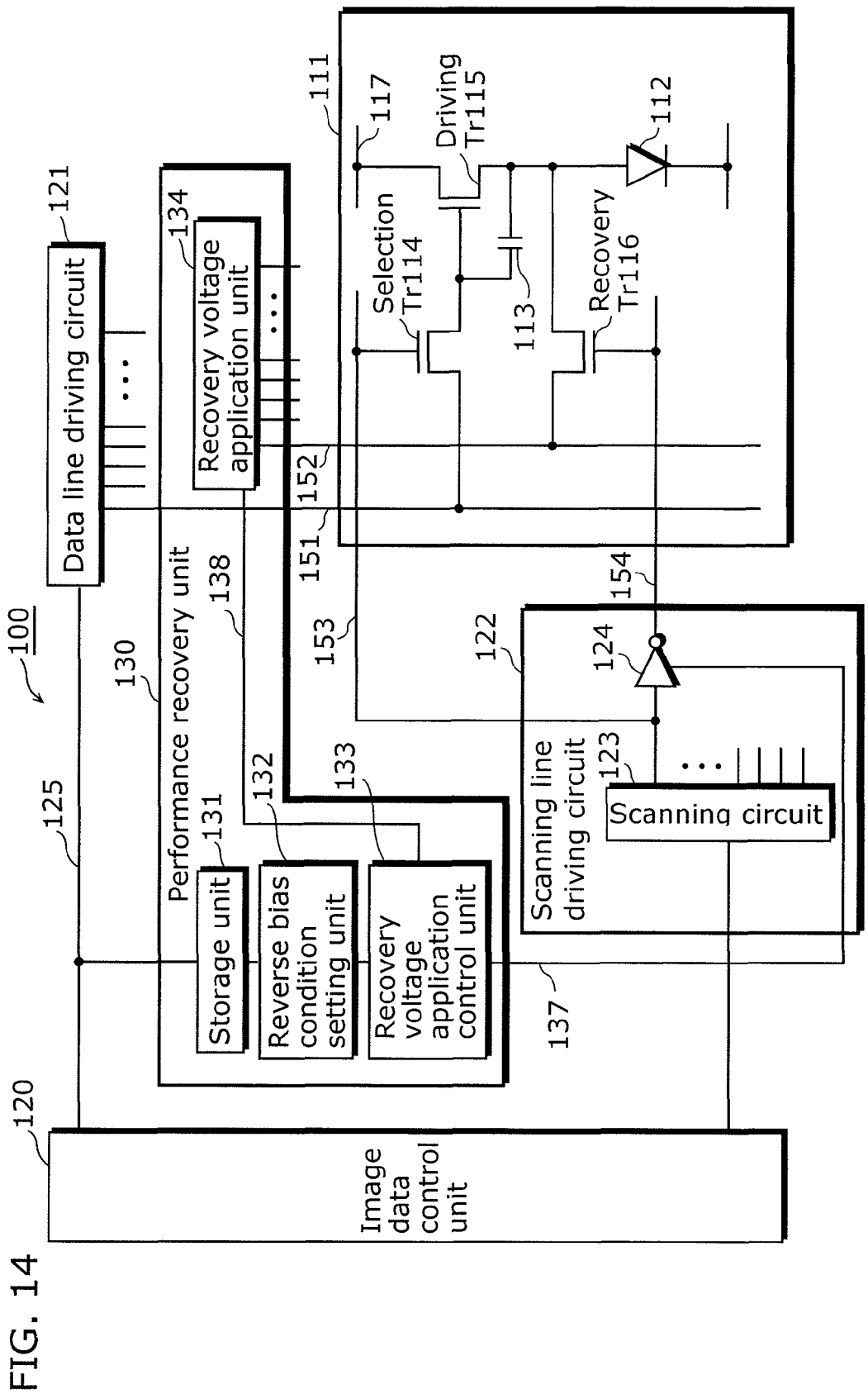
FIG. 14 is a functional block diagram showing an example of a detailed structure of main components of the display device.

FIG. 14 is a block diagram showing an example of a functional structure of major components of the display device 100.

Each of the pixel circuits 111 is structured by adding a recovery transistor 116 to a typical active matrix pixel circuit including an organic EL element 112, a capacitor 113 for holding luminance data, a selection transistor 114, and a driving transistor 115.

The scanning line driving circuit 122 provides each pixel circuit 111 with a selection gate signal 153 and a recovery gate signal 154, the data line driving circuit 121 provides the pixel circuit 111 with a data voltage 151 that specifies luminescence luminance, and the recovery voltage application unit 134 provides the pixel circuit 111 with a recovery bias voltage 152.

The image data control unit 120 receives image data to be displayed on the display unit 110, and outputs, to the data line driving circuit 121, a data voltage indicating signal 125 that indicates a data voltage according to a value of luminance of each of pixels which is indicated by the received image data.

The data line driving circuit 121 causes a DAC (Digital Analog Converter) included therein to generate the data voltage 151 indicated by the data voltage indicating signal 125 provided by the image data control unit 120. A driving voltage according to the generated data voltage 151 is held in the capacitor 113 via the selection transistor 114. The driving transistor 115 supplies, through a power line 117, the organic EL element 112 with an electric current according to the driving voltage held by the capacitor 113, and causes the organic EL element 112 to produce luminescence at desired luminance.

The scanning line driving circuit 122 includes a scanning circuit 123 and an inverter 124 provided to each of the columns. The scanning circuit 123 sequentially outputs a selection gate signal 153 for each column, and the inverter 124 outputs, only in a frame in which the recovery voltage application control unit 133 provides a recovery period indicating signal 137, the recovery gate signal 154 in a period that does not overlap with the selection gate signal 153.

In the performance recovery unit 130, the storage unit 131 stores, as luminescence luminance information corresponding to $V_t(+)$ of Embodiment 1, image data of each of the pixel circuits 111 for the N number frames. Instead of storing the luminescence luminance information as it stands, the storage unit 131 may encode and simply store only an upper portion of each piece of luminescence luminance information, thereby reducing its storage capacity.

The reverse bias condition setting unit 132 sets, for each of the N number of frames, a recovery condition by referring to luminescence luminance information of each pixel circuit for the N number of frames, the luminescence luminance information being stored in the storage unit 131. The recovery condition is set by comparing, to a threshold, a difference between peak luminance indicated by the luminescence luminance information for the N number of frames and average luminance, and a magnitude of the average luminance, according to the method described in Embodiment 1, the luminescence luminance information being stored in the storage unit 131.

The recovery voltage application control unit 133 outputs the recovery period indicating signal 137 in a frame (that is, one frame for each of the N number of frames) for which the reverse bias condition setting unit 132 sets the recovery condition, and at the same time outputs, to the recovery voltage application unit 134, a recovery bias voltage indicating signal 138 that indicates a set reverse bias voltage or intermediate voltage (for instance, ground voltage).

As described in Embodiment 1, for example, the recovery voltage application control unit 133 outputs the recovery bias voltage indicating signal 138 that indicates the reverse bias voltage only in a period where clock signal<reverse bias period control voltage, by causing a comparator to compare a sawtooth clock signal and a reverse bias period control voltage, and outputs the recovery bias voltage indicating signal 138 that indicates the intermediate voltage in a period other than the above period.

The recovery voltage application unit 134 causes a DAC included therein to generate a recovery bias voltage 152 indicated by the recovery bias voltage indicating signal 138 outputted from the recovery voltage application control unit 133. The generated recovery bias voltage 152 is applied to the recovery transistor 116.

After the N number of frames lighting, the scanning line driving circuit 122 outputs the recovery gate signal 154 which turns the recovery transistor 1160N, according to the recovery period indicating signal 137 provided by the recovery voltage application control unit 133. The recovery gate signal 154 is outputted in one frame for each of the N number of frames, that is, only in a frame in which the recovery voltage application control unit 133 outputs the recovery period indicating signal 137.

Turning the recovery transistor 1160N causes the recovery bias voltage 152 (including the intermediate voltage and the reverse bias voltage) outputted by the recovery voltage application unit 134 to be applied to the organic EL element 112. It is to be noted that a period in which the reverse bias voltage is applied to the organic EL element is a period in which the recovery bias voltage 152 is the reverse bias voltage, that is, only a period in which clock signal<reverse bias period control voltage is indicated by a result of comparing the sawtooth clock signal and the reverse bias period control voltage.

Next, the following describes an example of operations of the display device 100 structured in the above manner.

Figure 15:
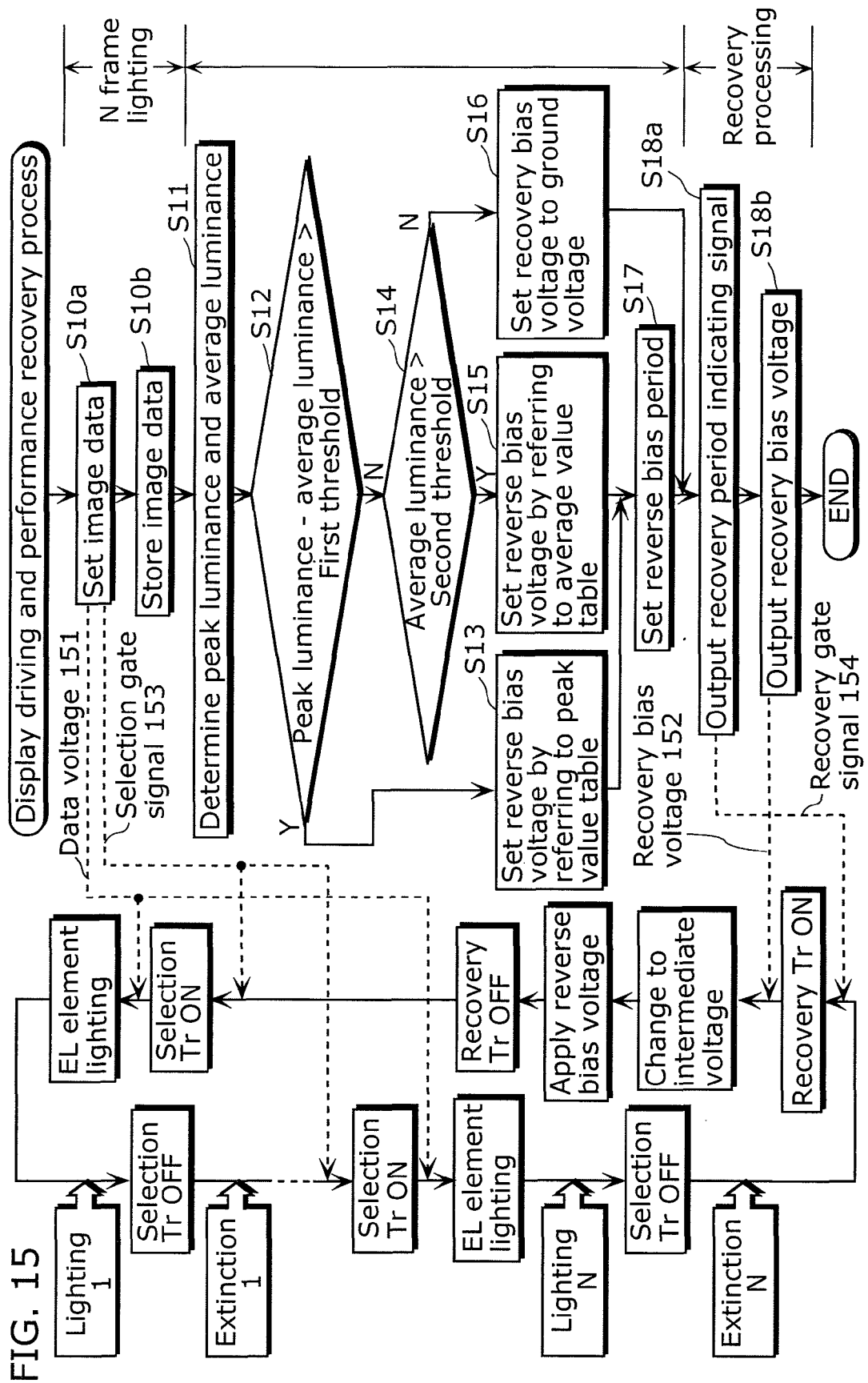
FIG. 15 is a flow chart showing an example of operations of the display device.

FIG. 15 is a flow chart showing an example of operations in an N number of frames of one of the pixel circuits of the display device 100. The right side of FIG. 15 shows an example of display driving and performance recovery processing performed by the image data control unit 120, the data line driving circuit 121, the scanning line driving circuit 122, and the performance recovery unit 130. The left side of FIG. 15 shows an example of operations of the pixel circuit corresponding to the display driving and the performance recovery processing.

Figure 16:
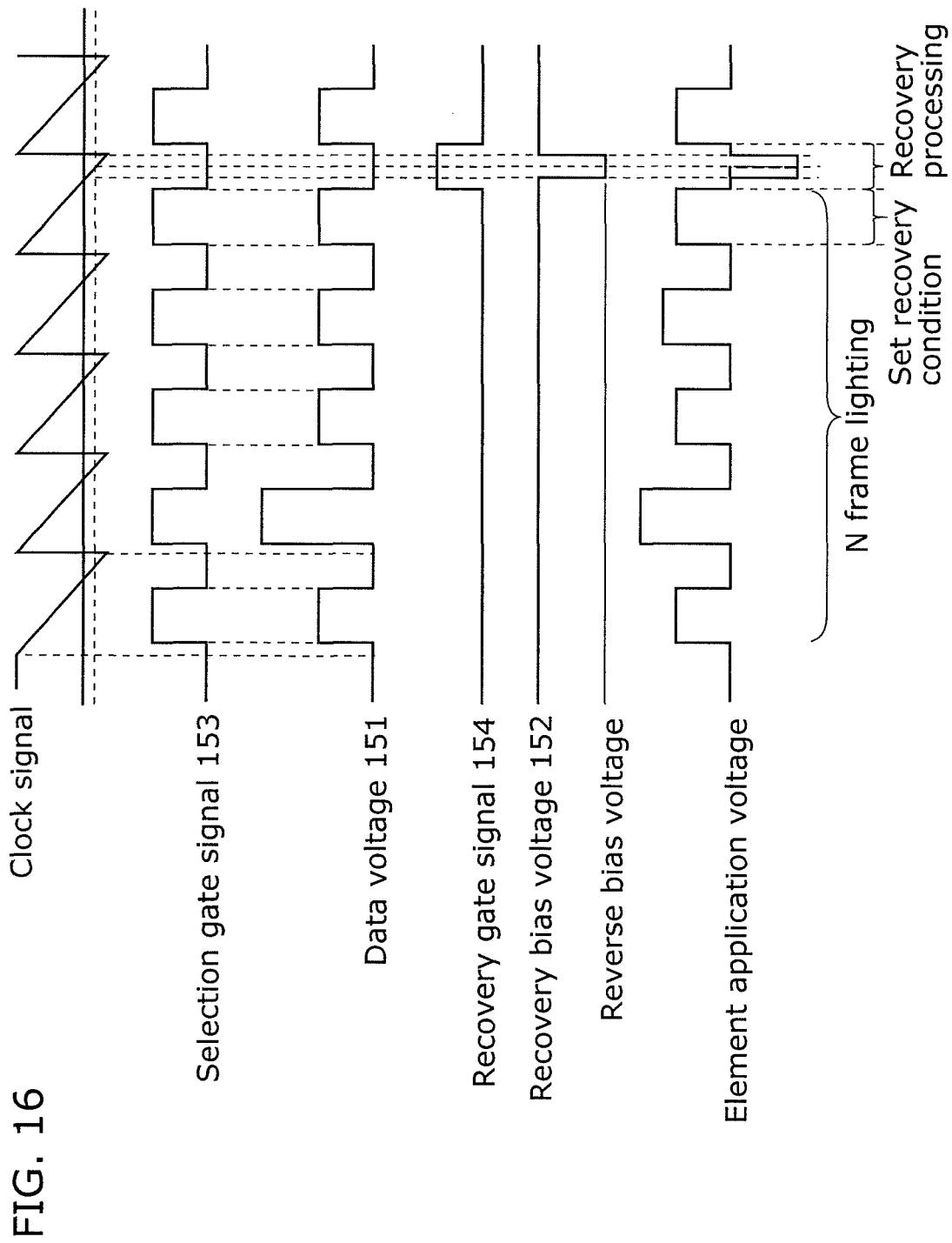
FIG. 16 is a flow chart showing an example of operations of the display device.

FIG. 16 is a timing diagram showing a time change of major signals when the display device 100 performs the operations according to the flow chart shown in FIG. 15.

In synchronization with output of the gate selection signal 153 by the scanning line driving circuit 122, control performed by the image data control unit 120 causes the data line driving circuit 121 to output the data voltage 151 according to the image data, and the organic EL element 112 to produce luminescence at desired luminance (S10a). Here, the storage unit 131 in the performance recovery unit 130 stores the image data used for lighting the organic EL element 112 (S10b). Such processing is performed over the N number of frames.

While the organic EL element 112 is producing the luminescence in an N-th frame, the reverse bias condition setting unit 132 sets a recovery condition in the same manner as the processes (S11 to S17 shown in FIG. 6) described in Embodiment 1. To put it differently, the reverse bias condition setting unit 132 determines peak luminance and average luminance by referring to image data of the N-th frame stored in the storage unit 131, and sets a reverse bias voltage and a reverse bias period according to the determined peak luminance and average luminance (S11 to S17).

When the recovery condition is set, the recovery voltage application control unit 133 outputs the recovery period indicating signal 137, and thus the recovery processing is started (S18a). When the output of the selection gate signal 153 is suspended in the N-th frame, the scanning line driving circuit 122 outputs the recovery gate signal 154 according to the recovery period indicating signal 137 provided by the recovery voltage application control unit 133.

In synchronization with the output of the recovery gate signal 154 by the scanning line driving circuit 122, control performed by the recovery voltage application control unit 133 causes the recovery voltage application unit 134 to output the recovery bias voltage 152 including the intermediate voltage (for instance, ground voltage) and the reverse bias voltage (S18b).

The outputted recovery bias voltage 152 is applied to the organic EL element 112 via the recovery transistor 116. Accordingly, an electric charge accumulated in the organic EL element 112 is removed, and deteriorated performance of the organic EL element is recovered.

As described above, the display device 100 according to Embodiment 2 of the present invention, that is, the active matrix display device 100, makes it possible to perform the application of the recovery bias voltage for recovering the performance of the luminescence element in the same manner as the display device 14 according to Embodiment 1, and thus makes it possible to extend the operating life of the luminescence element and suppress the deterioration in luminescence efficiency without imposing the large electric stress on the luminescence element. Further, it is possible to reduce the power consumption of the display device by suppressing the increase in the driving voltage or the driving current by optimizing the electrical power used for the reverse bias and suppressing the deterioration in luminescence efficiency.

It is to be noted that an active matrix display device which can perform the application of the recovery bias voltage for recovering the performance of the luminescence element in the same manner as the display device 14 according to Embodiment 1 is not limited to the display device 100. For example, the following modification can be considered.

Figure 17:
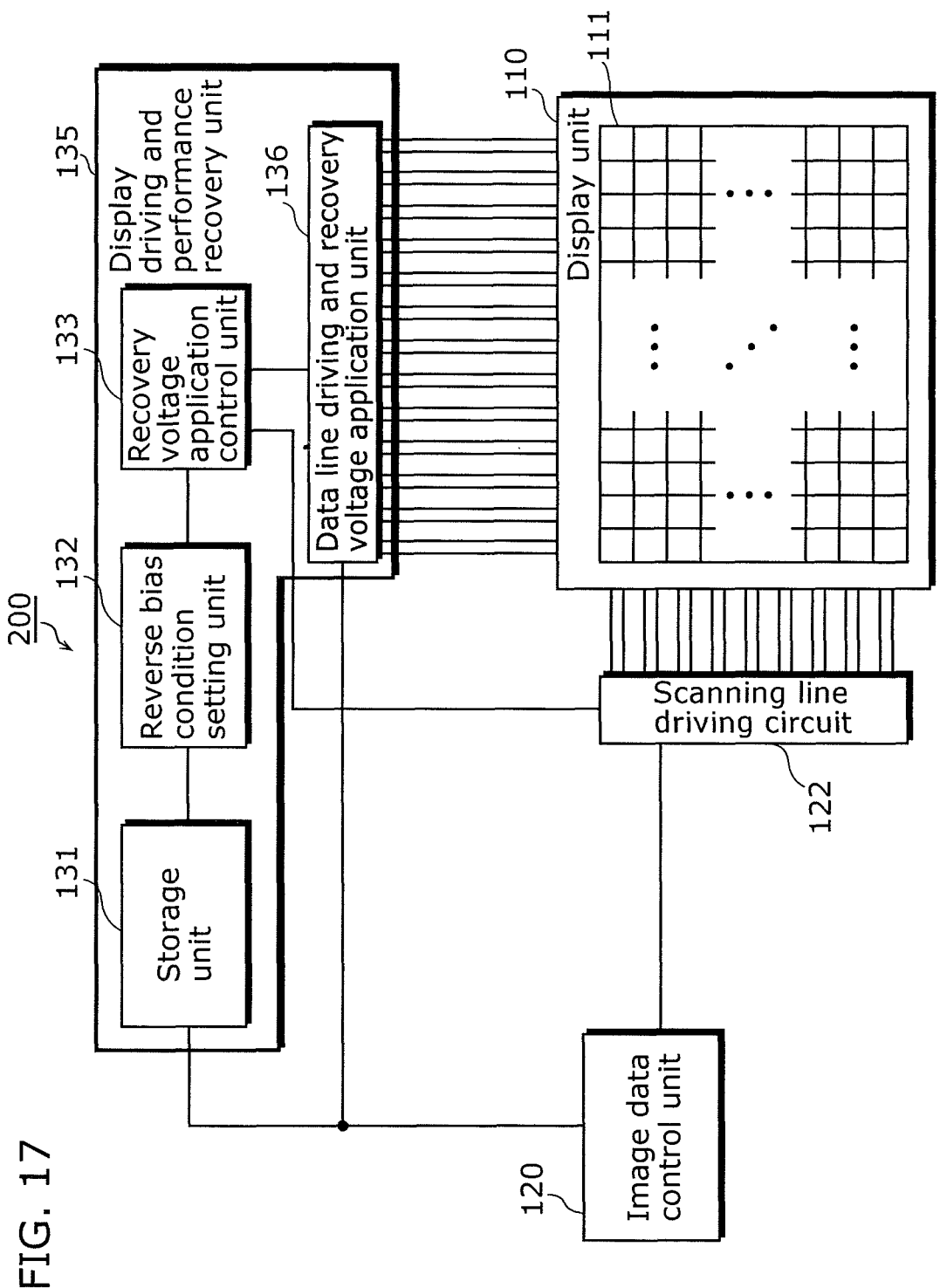
FIG. 17 is a functional block diagram showing an example of a structure of a display device according to a modification of Embodiment 2 of the present invention.

FIG. 17 is a block diagram showing an example of a functional structure of a display device 200 according to a modification. In comparison with the display device 100 shown in FIG. 13, a display driving and performance recovery unit 135 is provided instead of the performance recovery unit 130, and the data line driving circuit 121 and the recovery voltage application unit 134 are integrated into a data line driving and recovery voltage application unit 136.

Figure 18:
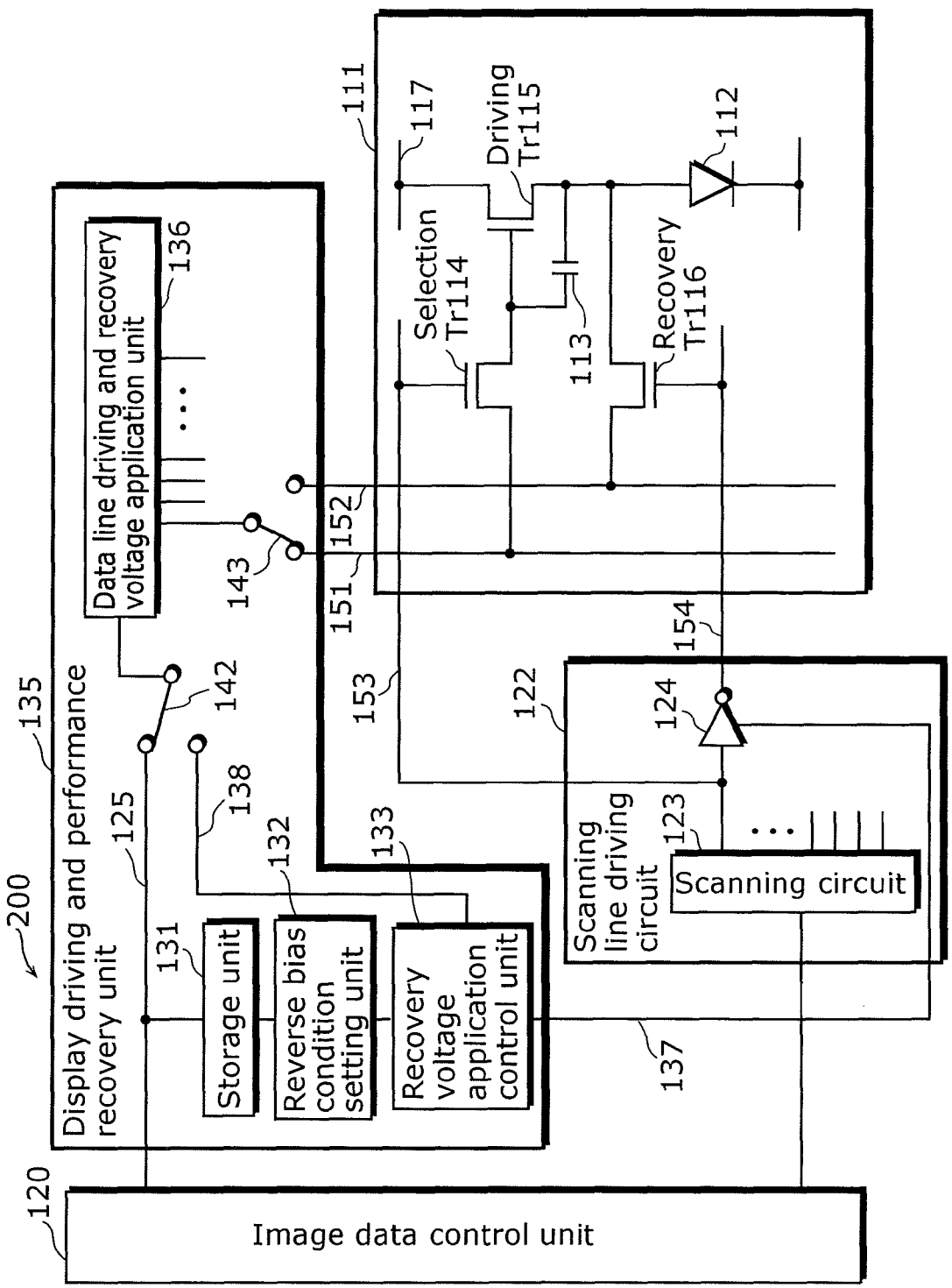
FIG. 18 is a functional block diagram showing an example of a detailed structure of main components of the display device.

FIG. 18 is a block diagram showing an example of a functional structure of major components of the display device 200. As shown in FIG. 18, the data line driving and recovery voltage application unit 136 generates the data voltage 151 by switching between a switch 142 and a switch 143, according to the data voltage indicating signal 125 outputted from the image data control unit 120, and generates the recovery bias voltage 152 according to the recovery bias voltage indicating signal 138 outputted from the recovery voltage application control unit 133.

Since one DAC included in the data line driving and recovery voltage application unit 136 can generate the data voltage 151 and the recovery bias voltage 152, such a structure is useful in simplifying a circuit in comparison with the display device 100 to which the data line driving circuit 121 and the recovery voltage application unit 134, each of which includes a DAC, are provided.

Although the display device of the present invention has been thus far described based on the embodiments, the present invention is not limited to the embodiments. The present invention includes modifications conceived by a person with an ordinary skill in the art within the scope of the present invention.

INDUSTRIAL APPLICABILITY

With the above structures, the present invention can be applied to luminescence elements, especially organic EL elements and luminescence source devices thereof, and to highly efficient and energy-saving display apparatuses and illuminating devices using the luminescence elements.

What is claimed is:

1. A display device comprising:
a luminescence element;
a power line that provides the luminescence element with an electric current;
a capacitor that accumulates a driving voltage corresponding to a data voltage;
a driver that flows the electric current according to the driving voltage accumulated in the capacitor through the luminescence element via the power line; and
a controller configured to:
set a reverse bias voltage and an application time period according to an amount of luminescence produced by the luminescence element; and
determine luminance levels in luminescence periods,
wherein the controller is configured to set the reverse bias voltage and the application time period according to a peak luminance of the luminance levels when a difference between the peak luminance and an average luminance of the luminance levels exceeds a predetermined threshold, and
the controller is configured to apply the reverse bias voltage for the application time period within an OFF period of the data voltage for removing an electric charge accumulated in the luminescence element, the OFF period being within one of the luminescence periods.

2. The display device according to claim 1,
wherein the controller is configured to set the revere bias voltage according to the amount of luminescence produced by the luminescence element and the application time period of the reverse bias voltage when the difference between the peak luminance and the average luminance is equal to or less than the predetermined threshold and when the average luminance exceeds a second threshold.

3. The display device according to claim 2,
wherein the controller is configured to not apply the reverse bias voltage to the luminescence element when the average luminance is equal to or less than the second threshold.

4. The display device according to claim 1,
wherein the controller is configured to apply, to the luminescence element, an intermediate voltage that is lower than the driving voltage and higher than the reverse bias voltage at least one of before and after the reverse bias voltage is applied to the luminescence element.

5. The display device according to claim 1,
wherein the OFF period is included in a last luminescence period among the luminescence periods.

6. The display device according to claim 1,
wherein the controller is configured to set the reverse bias voltage to be fixed and the application time period to be variable.

7. The display device according to claim 1,
wherein the controller is configured to set the reverse bias voltage to be variable and the application time period to be fixed.

8. The display device according to claim 1,
wherein the controller is configured to set the reverse bias voltage to be variable and the application time period to be variable.

9. The display device according to claim 1,
wherein the controller is configured to set the revere bias voltage according to the amount of luminescence produced by the luminescence element and the application time period of the reverse bias voltage, the amount of luminescence being a sum total of the luminance levels in each luminescence period.

10. The display device according to claim 1,
wherein the controller is configured to set the reverse bias voltage according to the amount of luminescence produced by the luminescence element and the application time period of the reverse bias voltage, the amount of luminescence being a sum total of luminescence luminance indicated by data signals corresponding to the data voltage in each of the luminescence periods.

11. The display device according to claim 1,
wherein the controller is configured to determine the amount of luminescence produced by the luminescence element based on a sum total of the luminance levels in each luminescence period and a sum total of luminescence luminance indicated by data signals corresponding to the data voltage in each of the luminescence periods, and the controller is configured to set the reverse bias voltage according to the amount of luminescence produced by the luminescence element and the application time period of the reverse bias voltage.

12. A control method for controlling a display device, the display device comprising:
- a luminescence element;
- a power line that provides the luminescence element with an electric current;
- a capacitor that accumulates a driving voltage corresponding to a data voltage;
- a driver that flows the electric current according to the driving voltage accumulated in the capacitor through the luminescence element via the power line; and
- a controller configured to set a reverse bias voltage and an application time period according to an amount of luminescence produced by the luminescence element, and the control method comprising:
- determining, with the controller, luminance levels in luminescence periods;
- setting, with the controller, the reverse bias voltage and the application time period according to a peak luminance of the luminance levels when a difference between the peak luminance and an average luminance of the luminance levels exceeds a predetermined threshold; and
- applying, with the controller, the reverse bias voltage for the application time period within an OFF period of the data voltage for removing an electric charge accumulated in the luminescence element, the OFF period being within one of the luminescence periods.

* * * * *